(12) United States Patent
Bright et al.

(10) Patent No.: US 9,216,813 B2
(45) Date of Patent: Dec. 22, 2015

(54) INFLATABLE AND RIGIDIZABLE SUPPORT ELEMENT

(75) Inventors: Alfram V. Bright, Arlington, MA (US); Richard Wlezien, Toano, VA (US)

(73) Assignee: TUFTS UNIVERSITY, Medford, MA (US)

( * ) Notice: Subject to any disclaimer, the term of this patent is extended or adjusted under 35 U.S.C. 154(b) by 304 days.

(21) Appl. No.: 13/516,453

(22) PCT Filed: Dec. 17, 2010

(86) PCT No.: PCT/US2010/061079
§ 371 (c)(1),
(2), (4) Date: Sep. 17, 2012

(87) PCT Pub. No.: WO2011/087724
PCT Pub. Date: Jul. 21, 2011

(65) Prior Publication Data
US 2012/0325965 A1    Dec. 27, 2012

Related U.S. Application Data

(60) Provisional application No. 61/289,230, filed on Dec. 22, 2009, provisional application No. 61/324,108, filed on Apr. 14, 2010.

(51) Int. Cl.
*B64C 3/30* (2006.01)
*B64C 3/56* (2006.01)
*B64C 39/02* (2006.01)

(52) U.S. Cl.
CPC ... *B64C 3/30* (2013.01); *B64C 3/56* (2013.01); *B64C 39/024* (2013.01); *B64C 2201/021* (2013.01); *B64C 2201/042* (2013.01); *B64C 2201/102* (2013.01); *B64C 2201/127* (2013.01); *Y02E 10/728* (2013.01)

(58) Field of Classification Search
CPC ...... B64C 2201/105; B64C 3/56; B64C 3/30; B64C 31/028; B64C 2201/00; B64C 2700/6295; B64C 39/00; B64C 3/40
USPC .......................... 244/123.11, 45 R, 46, 123.1
See application file for complete search history.

(56) References Cited

U.S. PATENT DOCUMENTS 2,571,607 A * 10/1951 Pipkin et al. ............... 431/360
2,813,412 A * 11/1957 Johnson ...................... 431/362

(Continued)

OTHER PUBLICATIONS

R. E. Allred, A. E. Hoyt and L. A. Harrah, "Light Curing Rigidizable Inflatable Wing" (AIAA 2004-1809) presented at the 45th AIAA/ASME/ASCE/AHS/ASC Structures, Structural Dynamics & Materials Conference, Apr. 19-22, 2004, Palm Springs, California.*

(Continued)

*Primary Examiner* — Tien Dinh
*Assistant Examiner* — Alexander V Giczy
(74) *Attorney, Agent, or Firm* — Casimir Jones, S.C.; Tanya Arenson; David Casimir

(57) ABSTRACT

The present invention provides novel inflatable and rigidizable support elements, and methods of manufacture and use thereof. In particular, the present invention provides inflatable and rigidizable support elements rapidly inflated and rigidized using an acrylic adhesive and UV light generated by combustion, which find use, for example, in rapidly deploying and supporting the wing of an aerial vehicle and wind turbine towers.

15 Claims, 34 Drawing Sheets

(56) References Cited

U.S. PATENT DOCUMENTS

| | | | |
|---|---|---|---|
| 3,943,046 A * | 3/1976 | De Sorga et al. | 522/4 |
| 4,514,447 A * | 4/1985 | Boxmeyer | 428/36.3 |
| 4,725,717 A | 2/1988 | Harrison | |
| 5,345,238 A * | 9/1994 | Eldridge et al. | 342/3 |
| 2003/0111953 A1* | 6/2003 | Trushell | 313/485 |
| 2005/0151007 A1* | 7/2005 | Cadogan et al. | 244/35 R |
| 2006/0221635 A1* | 10/2006 | Sohn et al. | 362/612 |
| 2008/0116054 A1 | 5/2008 | Leach et al. | |
| 2008/0184654 A1* | 8/2008 | Polyzois et al. | 52/651.01 |
| 2009/0211173 A1* | 8/2009 | Willey et al. | 52/40 |

OTHER PUBLICATIONS

Permabond UV625 Techincal Information Sheet, dated Oct. 2, 2005; accessed from http://www.silitech.ch/upload/fiche_technique_D/379.pdf on Jun. 27, 2014.*

Wikipedia, Acrylate polymer. http://en.wikipedia.org/wiki/Acrylate_polymer, accessed Jan. 28, 2015.*

Gisela K. Oster and R. A. Marcus, "Exploding Wire as a Light Source in Flash Photolysis", The Journal of Chemical Physics, vol. 27, No. 1, Jul. 1857, pp. 189-192.*

Search report for EP 2516256: Bright et al., "Inflatable and Rigidizable Support Element," http://worldwide.espacenet.com/publicationDetails/citedDocuments?CC=EP&NR=2516256A2&KC=A2&FT=D&ND=3&date=20121031&DB=worldwide.espacenet.com&locale=en_EP, accessed Jan. 28, 2015.*

Blattner & Sons, Inc. "A Self-Erecting Method for Wind Turbines. Phase 1: Feasibility and Preliminary Design." Xcel Energy Renewable Development Fund, May 2003.

Dayton A. Griffin, "WindPACT Turbine Design Scaling Studies Technical Area Composite Blades for 80- to 120-Meter Rotor" Mar. 21, 2000-Mar. 15, 2001.

DuPont Advanced Fiber Systems "Kevlar Aramid Fiber Technical Guide." vol. H-77848, 2000.

Fingersh et al., "Wind Turbine Design Cost and Scaling Model" NREL Dec. 2006.

GE Concepts, LLC, Addendum to WindPACT Turbine Design Scaling Studies Technical Area 3—Self-Erecting Tower and Nacelle Feasibility, 2002.

Goss, "Bonding glass and other substrates with UV curing adhesives" International Journal of Adhesion and Adhesives 2002, 22(5):405-408.

Haddon & Smith "The chemistry and applications of UV-cured adhesives." International Journal of Adhesion and Adhesives 1991, 11(3): 183-186.

Kjaer et al., "Wind energy-the facts: a guide to the technology, economics and future of wind power." European Wind Energy Association 2009, Brussels, Belgium.

M. Gardiner, Skystream 3.7 sectional monopole tower foundation and installation manual. Southwest Windpower Inc. Flagstaff, Arizona 86001 USA, Tec. Rep. 3-CMLT-1367-01, 2009.

Saint-Gobain Quartz S.A.S., "Quartzel Technical guide to Fused Quartz Textiles." 2004.

Smith, "WindPACT Turbine Design Scaling Studies Technical Area 2: Turbine, Rotor, and Blade Logistics" National Renewable Energy Laboratory Jun. 2001.

Wiser & Bolinger, "Annual Report on U.S. Wind Power Installation, Cost, and Performance Trends: 2007" National Renewable Energy Laboratory, US Department of Energy May 2008.

* cited by examiner

INFLATABLE AND RIGIDIZABLE SUPPORT ELEMENT

CROSS REFERENCE TO RELATED APPLICATIONS

The present application is a national phase application under 35 U.S.C. §371 of PCT International Application No. PCT/US2010/061079, filed on Dec. 17, 2010, which claims priority to application Ser. Nos. 61/289,230, filed Dec. 22, 2009 and 61/324,108, filed Apr. 14, 2010, each of which are herein incorporated by reference in its entirety.

FIELD OF THE INVENTION

The present invention provides inflatable and rigidizable support elements, and methods of manufacture and use thereof. In particular, the present invention provides compactable support elements which can be rapidly deployed into an extendable configuration through an inflation and rigidization procedure.

BACKGROUND

Building materials in general, and support elements in particular, are often large, heavy, costly, difficult to transport, difficult to erect, and/or difficult to deploy. Building projects and/or other endeavors (e.g. military, infrastructure, and/or humanitarian projects) at remote locations can be inhibited by difficult terrain, climate, or distance from large civil infrastructure. Lightweight and/or collapsible materials and support elements are more easily transported, but suffer from decreased stability and/or strength.

The availability of sustainable energy particularly electricity has been limited in remote locations such as small villages or scientific research sites due to terrain, climate, or distance from large civil infrastructure. Wind turbines are frequently used for producing electrical power however they usually require heavy and bulky towers in order to expose the turbine to higher wind velocities (Griffin, "WindPACT Turbine Design Scaling Studies Technical Area 1—Composite Blades for 80- to 120-Meter Rotor," 21 Mar. 2000-15 Mar. 2001. 44 Pp, 2001, herein incorporated by reference in its entirety). The mass of the tower and the equipment required for its installation increases exponentially with height (G. E. Concepts, "LLC, Addendum to WindPACT Turbine Design Scaling Studies Technical Area 3—Self-Erecting Tower and Nacelle Feasibility," 2002, herein incorporated by reference in its entirety). This limits the installed power at any location with rudimentary roads to the carrying capacity of people and/or light transportation equipment (D. Blattner and I. Sons, "A Self-Erecting Method for Wind Turbines. Phase 1: Feasibility and Preliminary Design.", herein incorporated by reference in its entirety). Additional technologies to address these and other deficiencies in the field are needed.

Deployable wings allow for aircraft to be easily transported to locations where the craft will be used. Deployable wings have been devised using various design concepts over a period of many years. The most notable technologies have been mechanically hinged wings, pressurized inflatable fabric wings and postrigidized inflatable wings. Mechanical hinging is the simplest and most common method for folding a traditional aircraft wing. This design has the advantage of simplicity and ease of adaptation to thin chord wings. However each mechanical hinge can only reduce the wingspan by a maximum of 50%, therefore each additional reduction in stowed length doubles the number of hinged joints. This exponential increase in mass causes structural deficiencies and leads to reliability problems. Inflatable wings solve the mass problems of mechanically hinged wings. Inflatable wings are composed of flexible fabric material that is fabricated into a segmented compartmentalized structure and is pneumatically inflated to extend to its full size, supported entirely by internal pressure. Since inflatable wings are made of fabric they are capable of high length and volume reduction ratios. Their low mass allows them to be deployed in seconds or less. Like the hinged wing, inflatable wings are restowable and redeployable. While inflatable wings have very high deployment reliability, continuous positive pressure is preferred to maintain structural integrity of the wing. This results in a vulnerability to loss of pressure from leaks or punctures. Another major drawback to the inflatable wing is onset of buckling at a lower bending moment compared to rigid wings. The two fundamental disadvantages of positively inflated wing structures are stiffness (i.e. resistance to buckling) and vulnerability to pressure loss. Both can be improved upon by rigidizing the flexible wing fabric shortly after inflation. By encapsulating the fabric fibers in a matrix and curing the matrix after the wings have been deployed, the assembly becomes a structural composite. Current structures have two main disadvantages: (1) slow matrix curing speed, and (2) lack of a lightweight and convenient mechanism for activation of matrix curing. Additional technologies to address these and other deficiencies in the field are needed.

SUMMARY OF THE INVENTION

The present invention provides inflatable and rigidizable support elements, and methods of manufacture and use thereof. In particular, the present invention provides compactable support elements which can be rapidly deployed into an extendable configuration through an inflation and rigidization procedure. Such elements find use in a variety of applications where portable, lightweight, and strong support elements are needed (e.g., military, recreation and humanitarian operations). In some embodiments, the elements are a component of deployable aircraft wings.

In some embodiments, the present invention provides a support element comprising a flexible fabric component and an acrylic adhesive component, wherein the flexible fabric component is encapsulated within the acrylic adhesive component. In some embodiments, the flexible fabric component comprises a UV-transparent fiber. In some embodiments, the flexible fabric component comprises fused-quartz glass fiber. In some embodiments, the support element comprises an inner lumen. In some embodiments, the support element is configured to adopt a fully extended, inflated, and/or deployed conformation upon application of pressurized gas to the inner lumen. In some embodiments, the support element is a structural element of an aircraft wing. In some embodiments, the support element is a component of a wind turbine tower.

In some embodiments, the present invention provides a system comprising (i) a support element comprising a flexible fabric component and an acrylic adhesive component, wherein the flexible fabric component is encapsulated within the acrylic adhesive component, and (ii) a UV-light-generating component. In some embodiments, the UV-light generating component is configured to generate UV-light from a combustion reaction. In some embodiments, the UV-light generating component comprises one or more pyrophoric metals. In some embodiments, the UV-light generating component comprises one or more oxidizer components. In some embodiments, the one or more pyrophoric metals comprise magnesium. In some embodiments, the one or more oxidizer components comprise solid $KClO_4$. In some embodiments, the system further comprises an igniter device. In some embodiments, the pyrophoric metal and oxidizer are configured to combust upon ignition by the igniter device.

In some embodiments, the present invention provides a method of deploying a support element comprising a flexible fabric component and an acrylic adhesive component, wherein the flexible fabric component is encapsulated within the acrylic adhesive component, comprising: (a) inflating the support element by applying pressurized gas to an inner lumen, and (b) exposing the acrylic adhesive component to UV-light, wherein the UV-light initiates curing of the acrylic adhesive. In some embodiments, the curing of the acrylic adhesive results in rapid rigidization of the support element. In some embodiments, the UV-light is generated by combustion of a pyrophoric metal and oxidizer. In some embodiments, full rigidization of the support element is reached in less than 10 seconds following initiation of combustion. In some embodiments, full rigidization of the support element is reached in less than 5 seconds following initiation of combustion. In some embodiments, deploying the support element results in deploying and supporting an aircraft wing. In some embodiments, UV-light is provided by sunlight. In some embodiments, full rigidization of the support element is reached in less than 1.5 hours following exposure to sunlight. In some embodiments, full rigidization of the support element is reached in less than 30 minutes following exposure to sunlight. In some embodiments, the support element is a structural element of an aircraft wing or a component of a wind turbine tower.

Additional embodiments are described herein.

BRIEF DESCRIPTION OF THE FIGURES

The following drawings form part of the present specification and are included to further illustrate aspects of the present invention. The drawings highlight exemplary embodiments of the present invention, but should not be viewed as limiting the scope of the invention. The invention may be better understood by reference to the drawings in combination with the detailed description of the specific embodiments presented herein.

DETAILED DESCRIPTION OF THE INVENTION

Figure 1:
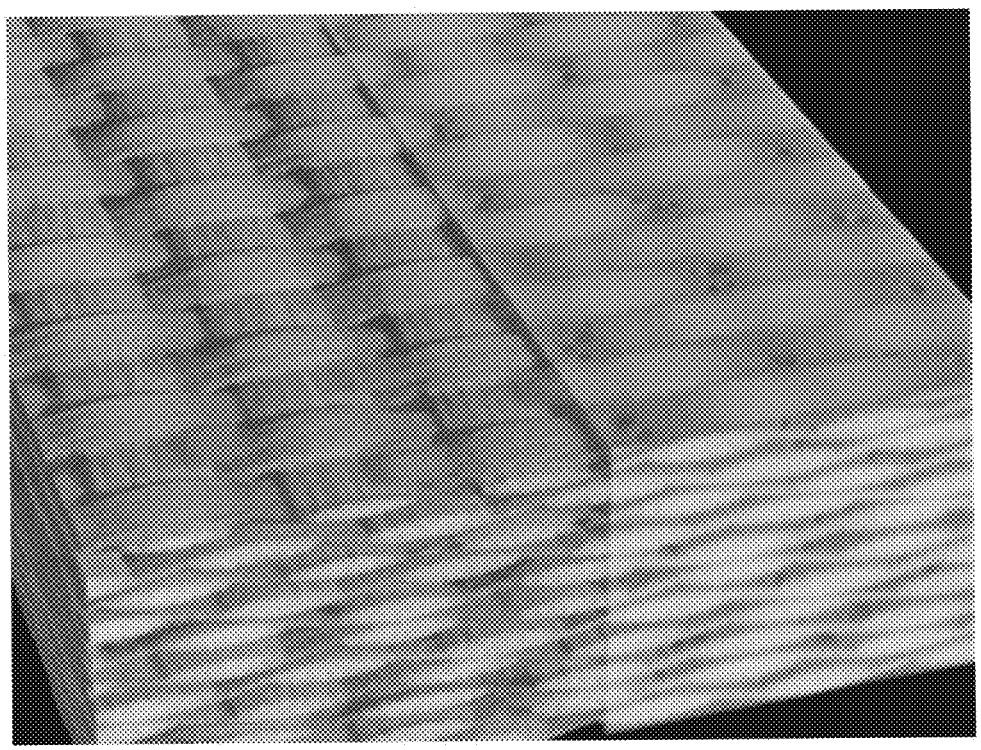
FIG. 1 shows a schematic of exemplary composite structures showing (a) woven fiber and (b) adhesive encapsulated fiber.

The present invention provides inflatable and rigidizable support elements, and methods of manufacture and use thereof. In particular, the present invention provides support elements which adopt a collapsed configuration and can be rapidly deployed into an extended configuration through inflation and rigidization procedure.

I. Support Elements

In some embodiments, the present invention provides support elements which are inflatable, deployable, extendable, and/or rigidizable. In some embodiments, support elements comprise a composite material comprising a flexible material (e.g. woven transparent fiber) and an adhesive (e.g. UV-activatable (e.g. UV-crosslinkable, UV-polymerizable) or thermally activatable). In some embodiments, a support element comprises an inner lumen and/or hollow core. In some embodiments, support elements are configured to adopt a collapsed (e.g. folded, packed, compacted, etc.) and/or reduced volume conformation. In some embodiments, support elements are deployed from a collapsed and/or reduced volume configuration into an extended and/or deployed configuration, upon inflation of the support element. In some embodiments, a support element is inflated via delivery of pressurized gas (e.g. air, inert gas, $CO_2$, etc.) in the inner lumen and/or hollow core of the support element. In some embodiments, a deployed and/or extended support element is rigidized through exposure to a rigidization-induction-agent (e.g. light (e.g. UV light (e.g. sunlight)), heat, chemical agent, etc.). In some embodiments, the support element is rapidly rigidized (e.g. <1 second, <5 seconds, <10 seconds, <15 second). In some embodiments, the inflation and rigidization procedures are rapid (e.g. <5 seconds, <10 second, <15 seconds, <30 seconds). In some embodiments, rigidization is induced by exposure of the adhesive portion of the composite structure to UV-light. In some embodiments, exposure of the adhesive to UV-light induces a chemical reaction in the adhesive which results in rigidization. In some embodiments, the source of UV light is a chemical reaction (e.g. combustion reaction (e.g. combustion of a pyrophoric metal (e.g. magnesium combustion))), electrical source, etc. In some embodiments, a UV source provides UV-light of the proper wavelength and sufficient intensity to induce rapid rigidization of the support element. In some embodiments, high intensity and/or high energy UV-light induces accelerated rigidization. In some embodiments, the light of the sun is used to induce rigidization without the need for a chemical reaction or external light source. In some embodiments, rigidization by sunlight occurs over approximately 1 minute to several hours (e.g. <1 minute, 2 minutes, 5 minutes, 30 minutes, 1 hour, 2 hours, 3 hours, 4 hours, 5 hours, and times therein). In some embodiments, sunlight rigidization is slower than rapid rigidization by chemical reaction, combustion, or external source, but sunlight rigidization applies UV light evenly to large structures without the requirement for large amounts of reactants or large energy sources.

Support elements are not limited to a particular shape. In some embodiments, support elements comprises any shape (e.g. elongate shape (e.g. beam, cylinder, tube, rod, shaft, etc.) suitable for supporting an external, internal, or attached mass. In some embodiments, a support element is elongate or globular. In some embodiments, a support structure comprises one or more elongate portions and one or more globular portions. In some embodiments, globular portions are spherical, ovular, polygonal, box-shaped, combinations thereof, or any other shapes suitable for a support element. In some embodiments, a support element is an elongate beam, rod, tube, shaft, joist, and/or stud. In some embodiments, an elongate support element has any suitable cross-sectional shape (e.g. circular, polygonal (e.g. square, rectangular, hexagonal, etc.), I-shape, ovular, teardrop, etc.). In some embodiments, a support element comprises an elongate tubular structure. In some embodiments, a support element is tapered over its length. In some embodiments, a support element comprises one or more attachment points for interaction with additional support elements, structural elements, and/or functional elements. In some embodiments, a support element has a hollow core (e.g. inner lumen). In some embodiments, a lumen runs the length of an elongate support element. In some embodiments, a hollow core is evenly distributed within a globular support element. In some embodiments, the size of an inner lumen is proportional to the size of a support element. In some embodiments, a support element comprises more than one inner lumens and/or hollow cores. In some embodiments, an inner lumen has one or more open ends. In some embodiments, a lumer has one open end and one sealed end. In some embodiments, a lumen provides a fluid-tight (e.g. air-tight) environment. In some embodiments, a lumen provides a fluid-tight (e.g. air-tight) environment, excluding any unsealed regions. In some embodiments, a support element comprises one or more valves to provide fluid access to a hollow core (e.g. an otherwise fully sealed lumen).

In some embodiments, the support elements of embodiments of the present invention are rapidly deployable from their collapsed to extended conformations. In some embodiments, the rapid curing of the adhesives of the present invention overcomes deficiencies found in the art. In some embodiments, lightweight and compact curing-initiators (e.g. exothermic chemical reaction (e.g. combustion of magnesium)) make the present invention highly mobile, configured for rapid deployment, and useful in settings (e.g. aviation) not previously available to the art. In some embodiments, the use of the sun as a curing initiator makes the components highly mobile and useful in settings (e.g. remote locations) not previously available to the art.

In some embodiments, structural elements provide one or more sites for attachment to other structural elements and/or materials. In some embodiments, a structural element comprises a collar, flange, or flanged collar for attachment to another structural element (e.g. foundation). In some embodiments, an attachment mechanism (e.g. bolting) is used to attach structural elements of the present invention to each other or to other elements (e.g. foundation, vehicle, turbine, generator, etc.). In some embodiments, a structural element provides climbing lugs for traversing the structural element by installation, maintenance, or operation personel. In some embodiments, structural elements comprise a pulley system (e.g. top-mounted pulley) for hoisting materials (e.g. turbine, support elements) along a support element of the present invention during installation, maintenance, or operation. In some embodiments, a support element is supported by other support elements. In some embodiments, a support element is supported by one or more guy-wires.

II. Composite

In some embodiments, the present invention provides support elements comprising a composite material. In some embodiments, a composite material comprises one or more flexible materials (e.g. fiber, fabric (e.g. fused quartz fiber), flexible polymer, etc.) and one or more activatable (e.g. crosslinkable, polymerizable, curable, solidifiable, rigidizable, etc.) adhesives (e.g. acrylic). In some embodiments, a composite comprises two or more different fibers and one or more adhesives, resins, and/or matrices. In some embodiments, a flexible material is encapsulated by an adhesive. In some embodiments, a flexible material is coated in an adhesive. In some embodiments, a flexible material is interwoven with an adhesive. In some embodiments, induction and/or activation (e.g. polymerization (e.g. photopolymerization), cross-linking (e.g. photocrosslinking), etc.) of the adhesive (e.g. acrylic) results in rigidization of the composite structure. Rigidization may be reversible or irreversible. In some embodiments, rigidization imparts strength to a structure (e.g. tensile strength, compressibility, bendability, etc.). In some embodiments, the composite of fabric and adhesive is flexible, foldable, compactable, compressible, and/or collapsable. In some embodiments, a rigidized composite of fabric and adhesive is rigid and substantially uncompressible.

In some embodiments, a support element (e.g. wing beam support, support tower (e.g. wind turbine tower)) comprises a flexible material (e.g. composite of fabric (e.g. fused quartz fiber) and adhesive (e.g. activatable adhesive (e.g. photopolymerizable adhesive (e.g. acrylic adhesive))) which is rigidizable (e.g. upon exposure to UV light). The rigidized element is capable of supporting loads (e.g. a wing and the loads and forces exerted during flight, a turbine and generator and the loads and forces associated with wind energy generation). In some embodiments, a composite fabric is cured in situ. In some embodiments, composite materials comprise fabric woven from high strength, high stiffness, fibers which are encapsulated in an adhesive (SEE FIG. 1). In some embodiments, unrigidized fibers provide tensile strength, but limited buckling performance in compression. In some embodiments, the rigidized adhesive provides support to the fibers and prevents buckling so that they can provide support functions in compression and bending, as well as in tension.

Figure 2:
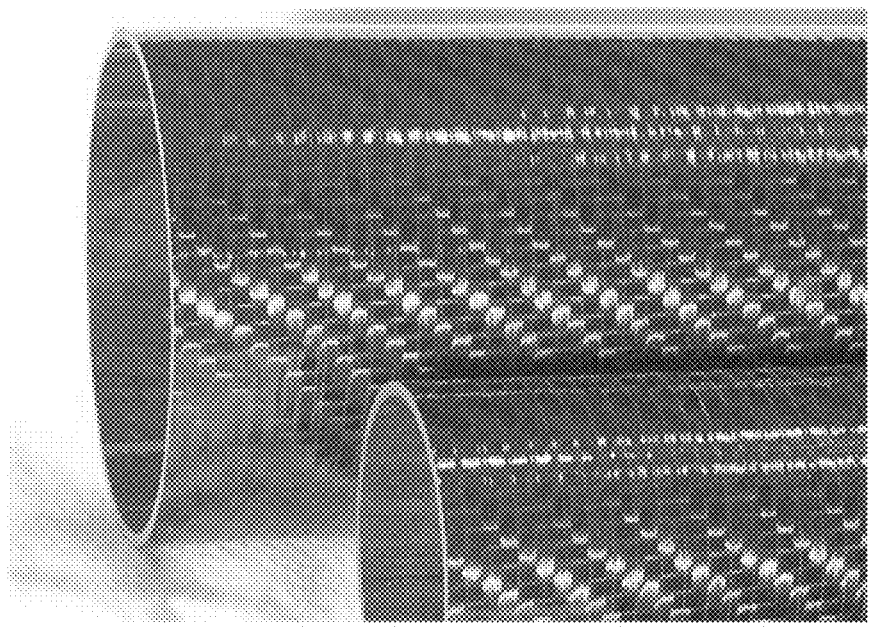
FIG. 2 shows carbon fiber composite tubes.

In some embodiments, fibrous composites are made into tubular shapes (SEE FIG. 2). In some embodiments, the fibrous composites are formed into any suitable shape (e.g. tubular, beam, stud, strut, rectangular-cross-section, polygonal-cross-section, I-beam, globular shape, tapered, combinations thereof, etc.). In some embodiments, a support elements of dry fabric are configured to be compacted to a fraction of it deployed size (e.g. folded tightly over itself, compressed, etc.).

III. Fabric

In some embodiments, support elements comprise one or more flexible materials (e.g. fabric, woven fibers, etc.). In some embodiments, one or more flexible materials comprise a portion of a composite material (e.g. fabric and adhesive). In some embodiments, a flexible material comprises a fiber or fabric. Suitable flexible materials include, but are not limited to carbon fiber, glass, fused silica, fiber glass, fused-quartz glass fiber, KEVLAR, E-grade glass, polymers, polymer fibers, woven metal, etc. In some embodiments, the composite material comprises one or more transparent and/or translucent material (e.g. fused-quartz glass). In some embodiments, the composite material comprises one or more materials transparent to a range of UV wavelengths (e.g. 10-50 nm, 25-100 nm, 50-250 nm, 100-200 nm, 100-300 nm, 200-400 nm, ranges therein, and combinations of ranges). In some embodiments, the composite material comprises one or more materials transparent to a subtype of UV light (e.g. UVA, near UV, UVB, medium wave UV, middle UV, UVC, far UV, vacuum UV, low UV, super UV, extreme UV, combinations thereof, etc.). In some embodiments, the composite material comprises one or more materials transparent to a range of wavelengths of light within the 200-400 nm range.

In some embodiments, structural fibers include, but are not limited to, carbon fiber, fiberglass, glass, E-grade glass, fused quartz fiber, and synthetic polymers, KEVLAR, etc. In some embodiments, fibers and/or adhesives are low density to produce a lightweight as well as strong composite. In some embodiments, the multitudes of fibers in the material block pathways for crack propagation, making the material very resistant to fatigue.

Figure 4:
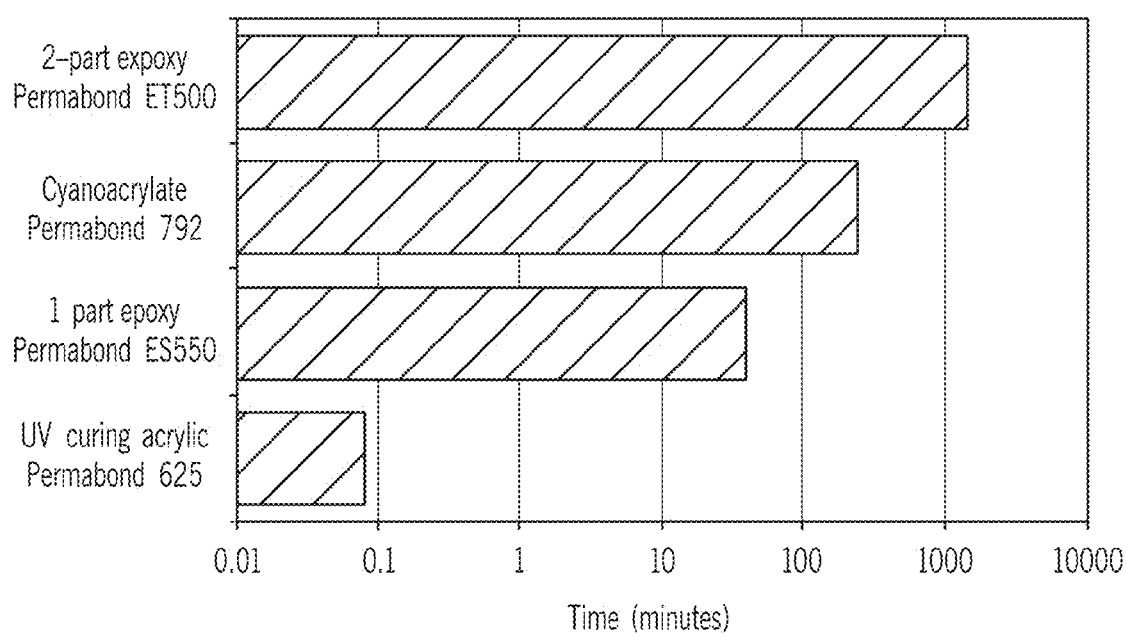
FIG. 4 shows a histogram of typical curing times of various adhesives.

In some embodiments, a structural fiber (e.g. transparent to UV, translucent to UV, opaque to UV) is fused-quartz glass. In some embodiments, quartz glass provides useful dielectric and high temperature mechanical properties. Unlike conventional electrical grade borosilicate fiberglass (E-glass), quartz is transparent to UV and does not block UV above 270 nm (SEE FIG. 4). In some embodiments, quartz fiber is a suitable structural material because it has a higher tensile strength and modulus than typical E glass.

IV. Adhesive

In some embodiments, support elements comprise one or more matrix materials, resins, and/or adhesives, which may be referred to herein as adhesives. In some embodiments, a composite material comprises one or more adhesives. In some embodiments, an adhesive is activatable (e.g. polymerizable, crosslinkable, solidiable, rigidizable, etc.). In some embodiments, an adhesive is activatable (e.g. polymerizable, crosslinkable, solidiable, rigidizable, etc.) such that it can be induced to undergo a physical and/or chemical modification (e.g. polymerize, cross-link, rigidize). In some embodiments, activation of an adhesive is initiated by chemical-induction, heat-induction, and/or light-induction (e.g. photopolymerization, photo-cross-linking, etc.).

In some embodiments, a composite material comprises one or more UV-inducible and/or UV-activatable adhesives. Exemplary UV-activatable adhesives include, but are not limited to, acrylates, epoxy acrylates, urethane arylates, polyester and polyether acrylates and acrylic and vinyl polymers (See e.g., Goss, Intl. Journal of Adhesion and Adhesives 22 (2002) 405 and Haddon and Smith, Intl. Journal of Adhesion and Adhesives 11 (1991) 183; each of which is herein incorporated by reference). In some embodiments, a composite comprises one or more photopolymerizing adhesives (e.g. acrylic adhesive (e.g. PERMABOND 625)).

In some embodiments, an adhesive (e.g., acrylic adhesive) is photopolymerizable under exposure to UV light (e.g. specific wavelength ranges of UV light, sunlight, etc.). In some embodiments, polymerization of adhesive material results in rigidization. In some embodiments, an adhesive is activated (e.g. induced to polymerize, cross-link, rigidize, etc.) by a specific range of UV wavelengths (e.g. 10-50 nm, 25-100 nm, 50-250 nm, 100-200 nm, 100-300 nm, 200-400 nm, ranges therein, and combinations of ranges). In some embodiments, an adhesive is activated (e.g. induced to polymerize, cross-link, rigidize, etc.) by a sub-type of UV light (e.g. UVA, near UV, UVB, medium wave UV, middle UV, UVC, far UV, vacuum UV, low UV, super UV, extreme UV, combinations thereof, etc.). In some embodiments, an adhesive is activated (e.g. induced to polymerize, cross-link, rigidize, etc.) by a range of wavelengths of light within the 200-400 nm range.

Figure 3:
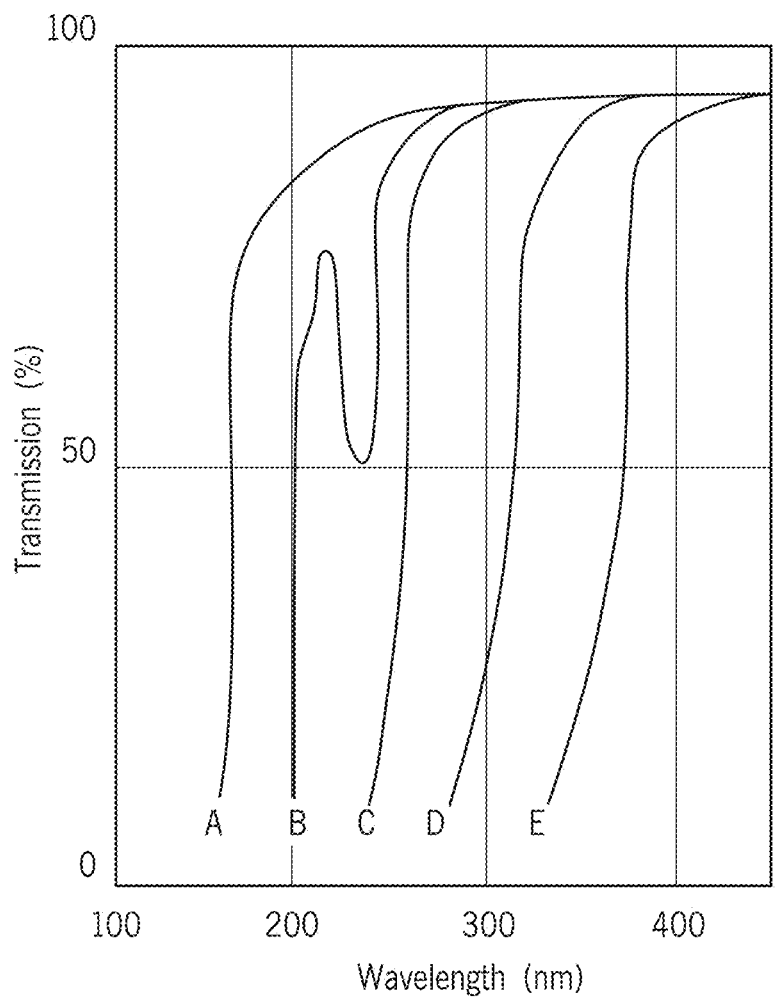
FIG. 3 shows a graph of UV transmissibility of different glass types.

The art provides many "fast-curing" adhesives capable of reaching a tacky state in their rated cure time (e.g. 30 s-5 min). "Fast-curing" adhesives take a significantly longer time (e.g. 500%-1000% additional time) to reach their full rated strength. In some embodiments, "fast-curing" adhesives require time for solvents to evaporate or for thermosetting chemical reactions to occur. In some embodiments, the speeds of curing processes are influenced by temperature. In some embodiments, UV-curing adhesives (e.g. acrylic adhesives) are capable very rapid (e.g. 1 second, 5 seconds, 10 seconds, 15 seconds, times therein) curing to full strength (e.g. full cure). In some embodiments, photopolymerizing adhesives (e.g. acrylic adhesives) cure to full strength in 5-15 seconds. In some embodiments, UV-curing adhesives (e.g. photopolymerizing adhesives (e.g. acrylic adhesives (e.g. PERMABOND 625))) achieve a full cure in 5 seconds when exposed to 4 mW/cm$^2$ of 200-400 nm UV radiation (SEE FIG. 3). In some embodiments, UV-curing adhesives (e.g. photopolymerizing adhesives (e.g. acrylic adhesives (e.g. PERMABOND 625))) achieve rapidly cure to full-strength (e.g. <1 second, <2 seconds, <5 sceonds, <10 seconds, <15 seconds, etc.) when exposed to 4 mW/cm$^2$ of 200-400 nm UV radiation. In some embodiments, curing of UV-curable adhesives (e.g. acrylic adhesives (e.g. PERMABOND 625)) can occur over a wide temperature range of −20 to +150 C. The rapid curing and temperature insensitivity of UV curing adhesives is due to high-energy photons provided from an external radiation source (e.g. UV-light from a chemical reaction (e.g. combustion reaction)) which drive the chemical curing process. In some embodiments, two-part and solvent evaporative adhesives are rate limited by molecular interaction, which is proportional to the temperature and fraction of unreacted molecules available to react. UV-curing adhesives overcome this limitation.

In some embodiments, UV-curing adhesive (e.g. acrylic adhesive) requires exposure to UV radiation. In some embodiments, UV-curing adhesive (e.g. acrylic adhesive) requires exposure to direct UV radiation. In some embodiments, a composite material utilizing UV-curing adhesive requires exposure on both sides due to the light blocking properties of its fiber mass. In some embodiments, a composite material utilizing UV-curing adhesive is fully polymerizable and rigidizable from one-sided UV-exposure (e.g. UV-transparent fiber).

In some embodiments, thermally cured adhesives are utilized. Thermally cured thermoset composites are a class of rigidizable materials that offer excellent structural performance and flexibility in design. In some embodiments, the composite consists of a fibrous material (e.g. reinforcement material) that is impregnated with a thermoset polymer resin. The resin is chemically hardened, rigidized, polymerized, or cross-linked, when exposed to heat. In some embodiments, the cure cycle is dependent on the matrix material selected and can range from minutes to several hours. There are several methods of introducing heat for activation of thermal-activated composites including but not limited to solar illumination, resistive heating by embedded heater elements. In some embodiments, the composite material is encased on both sides by a thin polymeric film that acts as a pressure barrier and prevents blocking (adhesion) of the material in the packed state. In some embodiments, because the thermally cured rigidizable material is a composite material, it has excellent design flexibility to obtain the required laminate properties through reinforcement design or structure cross-section design. Several variables can be tailored to optimize the system including weave styles, ply orientation, number of plies, thickness of plies, etc. In some embodiments, reinforcing materials include, but are not limited to graphite and other high tenacity fiber systems (e.g. including VECTRAN, KEVLAR, and PBO (P-phenylene-2-6-benzobisoxazole)). In some embodiments, a thermosetting (e.g. thermal-activated) material cured with a thermosetting resin such as epoxy, can yield extremely stiff laminates, especially when uniaxial fibers are utilized. In some embodiments, high performance thermosetting composites exhibit high specific strength and stiffness properties. In some embodiments, thermally cured thermoset composites are cured via embedded heaters for optimal control of the rigidization process.

V. Activation Sources

In some embodiments, the present invention provides one or more activation sources to initiate hardening, rigidization, polymerization, cross-linking, etc. of a composite. In some embodiments, sunlight provides the activation source for rigidization. In some embodiments, the present invention comprises one or more compositions (e.g. reactants (e.g. combustibles, reactants in an exothermic reaction)), devices (e.g. electrical source device, capacitor, heat-generating device, etc.), and/or systems (e.g. igniter, combustible material, and oxidizer) for inducing rigidization of a composite support element of the present invention. In some embodiments, the present invention provides a heat source, source of chemical inducers, and/or source of UV energy (e.g. reactants for a combustion reaction).

In some embodiments, the present invention provides a source of UV light, radiation, energy, and/or electromagnetic waves (e.g., mercury vapor lamps, banks of UV LED's, Xenon strobe lamps, the sun). In some embodiments, a UV source provides sufficient UV light to initiate polymerization, cross-linking, and/or rigidization of an adhesive and/or a composite of the present invention. In some embodiments, a UV source provides >1 mW/cm$^2$ (e.g. >2 mW/cm$^2$, >3 mW/cm$^2$, >4 mW/cm$^2$, >5 mW/cm$^2$, >10 mW/cm$^2$, >20 mW/cm$^2$, >50 mW/cm$^2$, >100 mW/cm$^2$, etc.) of UV radiation. In some embodiments, a UV source provides a range of UV wavelengths (e.g. 10-50 nm, 25-100 nm, 50-250 nm, 100-200 nm, 100-300 nm, 200-400 nm, ranges therein, and combinations of ranges). In some embodiments, a UV source provides one or more sub-types of UV light (e.g. UVA, near UV, UVB, medium wave UV, middle UV, UVC, far UV, vacuum UV, low UV, super UV, extreme UV, combinations thereof, etc.). In some embodiments, a UV source provides a range of wavelengths of light within the 200-400 nm range.

In some embodiments, a UV source comprises two or more reactants in an exothermic chemical reaction that produce UV light. In some embodiments, a UV source comprises one or more reactants in a combustion reaction that produces UV light. In some embodiments, a UV light source comprises one or more fuels (e.g. a pyrophoric metal) and one or more oxidants. In some embodiments, a UV source comprises one or more fuels and/or combustible materials. In some embodiments, a UV source comprises one or more pyrophoric metals (e.g. magnesium). In some embodiments, a UV source comprises magnesium and an oxidant. In some embodiments, a UV source provides a chemical reaction which produces the desired wavelengths and intensity of UV light. In some embodiments, a UV source provides a combustion reaction (e.g. pyrophoric metal (e.g. magnesium) and oxidant (e.g. $KClO_4$)) which produces the desired wavelengths and intensity of UV light.

In some embodiments, the present invention provides one or exothermic chemical reactions to induce or activate the polymerization, rigidization, and/or cross-linking of a composite and/or adhesive of the present invention. In some embodiments, a combustion reaction provides heat and/or UV light to initiate rigidization. In some embodiments, an exothermic chemical reaction (e.g. combustion (e.g. magnesium combustion)) is a heat source for heat-induction of rigidization of a composite (e.g. for a thermally cured composite material). In some embodiments, exothermic chemical reactions (e.g. combustion) provide sufficient thermal energy for a thermal curing.

In some embodiments, the present invention provides UV and/or heat from the high-temperature alloying of metals to induce curing of a composite. In some embodiments, the alloying of two metals can release large quantities of heat and/or UV light (e.g. sufficient quantities of UV and heat to induct curing). In some embodiments, PYROFUZE utilizes the alloying of metals to produce heat and UV. In some embodiments, PYROFUZE produces no combustion products (e.g. smoke) which could be a concern for certain applications. In some embodiments, PYROFUZE comprises bringing two metallic elements in intimate contact with each other at an initiating temperature where they alloy rapidly resulting in instant deflagration without support of oxygen. Exposure of the metals to the minimum initiation temperature triggers the reaction resulting in temperatures in excess of the boiling point of the constituents. In some embodiments, PYROFUZE is used to provide UV and/or heat for the initiation of curing a composite of the present invention. In some embodiments, thermal energy is released of an approximate minimum reaction temperature of 2800° C./5000° F.

In some embodiments, the present invention provides an "exploding wire technique" (Oster, Journal of chemical Physics, vol. 27, 1957; herein incorporated by reference in its entirety.) In some embodiments, the present invention provides an exploding wire technique combined with a supercapacitor energy storage device as a UV source. In some embodiments the exploding wire technique is an electrically powered UV-curing initiation device. In some embodiments, an electrically powered UV curing device (e.g. exploding wire technique) is combined with supercapacitors. In some embodiments, the present invention provides a simple, lightweight, and efficient method for generating UV with an electric spark.

In some embodiments, a UV source comprises an igniter and/or ignition device. In some embodiments, an igniter and/or ignition device initiates a chemical reaction (e.g. exothermic chemical reaction (e.g. combustion)). In some embodiments, an igniter and or ignition device provides the activation energy to initiate a chemical reaction and/or other source of heat and/or UV light.

VI. Uses

In some embodiments, the present invention provides inflatable and rigidizable support elements which find utility in a variety of application (e.g. military, aviation, recreational, humanitarian, agricultural, survival, construction, medical, wind energy generation, etc.). In some embodiments, support elements find use in any application where it is advantageous for structural and/or support elements to be rapidly deployed. In some embodiments, support elements of the present invention find use in any application where it is advantageous for structural and/or support elements to adopt both a collapsed conformation (e.g. compact, reduced size, reduced volume, etc.) and an expanded conformation (e.g. deployed, extended, etc.). In some embodiments, support elements of the present invention find use in any application where it is advantageous for structural and/or support elements to be stored, used, and/or transported in a compact configuration, and then rapidly deployed into an extended conformation for use and/or use in a different manner.

In some embodiments, the present invention finds use in aeronautics (e.g. wing beam). As described below, in some embodiments, the present invention provides supports for the wings of an aircraft (e.g. unmanned aerial vehicle), which adopt a collapsed conformation and then are rapidly deployed into an extended conformation for flight.

In some embodiments, the present invention provides structural supports for constructing temporary structures (e.g. tents, scaffolding, hangar, homes, Quonset hut, etc.) useful in military (e.g. for constructing a mobile base), recreational (e.g. rapidly deployable tent poles), humanitarian (e.g. setting up a refugee camp and/or aid station in a remote location), construction (e.g. building in remote or difficult to access locations), space travel (e.g. constructing a space station, or making repairs to a satellite, etc.) etc. In some embodiment, the present invention provides structural supports for constructing permanent structures which are desired to be raised in a rapid fashion and/or utilize compact support elements to be shipped to a remote or difficult to access environment or location (e.g. desert, jungle, outer space, moon, mars, etc.

In some embodiments, the materials and methods of the present invention find use with structural elements for a wind turbine (e.g. structural support, tower, etc.). In some embodiments, rapid setup and/or transport of structural elements to difficult to access or remote locations maximizes the availability of wind energy in rugged, remote, and/or poor areas of the world. In some embodiments, a composite tower for small wind turbines is lightweight, easily transportable, and/or capable of rapid installation without cranes or other heavy equipment. In some embodiments, a turbine support (e.g. tower) is significantly more lightweight than standard or traditional towers (e.g. steel towers). In some embodiments, a turbine support (e.g. tower) is as little as 5% of the weight (e.g. 30% . . . 20% . . . , 10%, and weights therein) or less (e.g. 4%, 3%, 2%, 1%) of a traditional steel tower (e.g. steel tower). In some embodiments, the low mass combined with an extremely compact transportable form provides the ability for a wind turbine to produce approximately 1.75 times (e.g. 1.5, 1.75, 2.0, 2.25, 2.5, 3, 4, 5, etc.) the generated power for the same cost as with a steel tower. In some embodiments, the ease of transportation, low cost, and rapid installation of the composite turbine supports provide wind energy to otherwise unaccessible regions (e.g. difficult terrain, remote areas, low income regions).

EXPERIMENTAL

The following section provides exemplary embodiments of the present invention, and should not be considered to be limiting of its scope with regard to alternative embodiments that are not explicitly described herein.

Example 1

UV-Curing Source Validation

Acrylic adhesive requires exposure to UV energy from 200-400 nm at an energy level greater than 5 J per gram of adhesive per second. UV adhesives are typically used in industrial settings where this level of UV radiation is achieved with low pressure mercury vapor lamps, xenon strobes or arrays of high power UV LEDs. Experiments were conducted during development of embodiments of the present invention to identify a mechanism for generating such UV energy in a means amenable to the goals of the present invention (e.g. compact, lightweight), however, the present invention is not limited to any particular mechanism.

Review of Electric-Source UV-Curing Technologies.

A theoretical comparison of existing UV curing technologies was developed using models of each system. These models used the most advanced components currently available, configured for operation in an aircraft. The figures of merit are specific energy density, volumetric energy density and specific power density based on curing 1 gram of adhesive per second.

The following parameters were compared: (1) overall UV conversion efficiency (the combined efficiency of all system components (e.g. lamps, electrical storage and intermediaries such as transformers) to convert stored energy into UV radiation); (2) specific energy density (the total amount of energy stored and delivered per gram of system mass); (3) volumetric energy density (the total amount of energy stored and delivered per system volume); (4) maximum specific power density (the maximum power deliverable normalized with system mass, this is controlled by the most power limiting system component); and (5) curing performance (the total system mass and volume required to cure 1 gram of adhesive per second).

The first electrical system tested consists of high output UV LEDs powered by a lithium ion battery. Nichia type 033 LEDs with a maximum optical power of 250 mW and a lamp UV conversion efficiency of 7.5% were used. The total mass of per LED was approximated at 2.2 g which includes its copper wire, aluminum heatsink and minimal pc board. A Panasonic lithium-ion battery with a specific energy density of 648 J/g, a volumetric energy density of 1400 J/cm^3, a specific power density of 1 W/g and a storage efficiency of 85% was used. The total system conversion efficiency is 6.4%, its specific total energy density is 1.25 $J/g_{sys}$, its volumetric energy density is 5.56 $J/cm^3$ and its specific power density is 0.56 $W/g_{sys}$.

The second electrical system is a low-pressure mercury lamp powered by a lithium ion battery. The lamp is based on generic high-performance data. Mass and volume is based on an industrial Blak-Ray 100-A Long-wave UV lamp but pro-rated for non-industrial use (mass and volume of critical components only then multiplied by 0.5). Maximum optical power is unknown but assumed to be unlimited in this case. Conversion efficiency is 35%. The transformer conversion efficiency is 88%. The same lithium ion battery specs are used as above. The total system conversion efficiency is 17%, its specific total energy density is 0.05 $J/g_{sys}$, its volumetric energy density is 0.2 $J/cm^3$ and its specific power density is 0.04 $W/g_{sys}$.

The third electrical system is a xenon strobe tube powered by a super capacitor. The lamp is based on generic high-performance strobe tube data. Mass and volume is based an industrial strobe unit pro-rated for non-industrial use (mass and volume of critical components only then multiplied by 0.5). Maximum optical power is unknown but assumed to be unlimited in this case. The lamps conversion efficiency is 10%. The energy storage device is a generic super capacitor with an energy density of 100 J/g and a specific power of 6 W/g. The total system conversion efficiency is 9%, its specific total energy density is 0.1 $J/g_{sys}$, its volumetric energy density is 0.9 $J/cm^3$ and its specific power density is 8 $W/g_{sys}$.

Results, Electrically-Based UV Systems.

Figure 5:
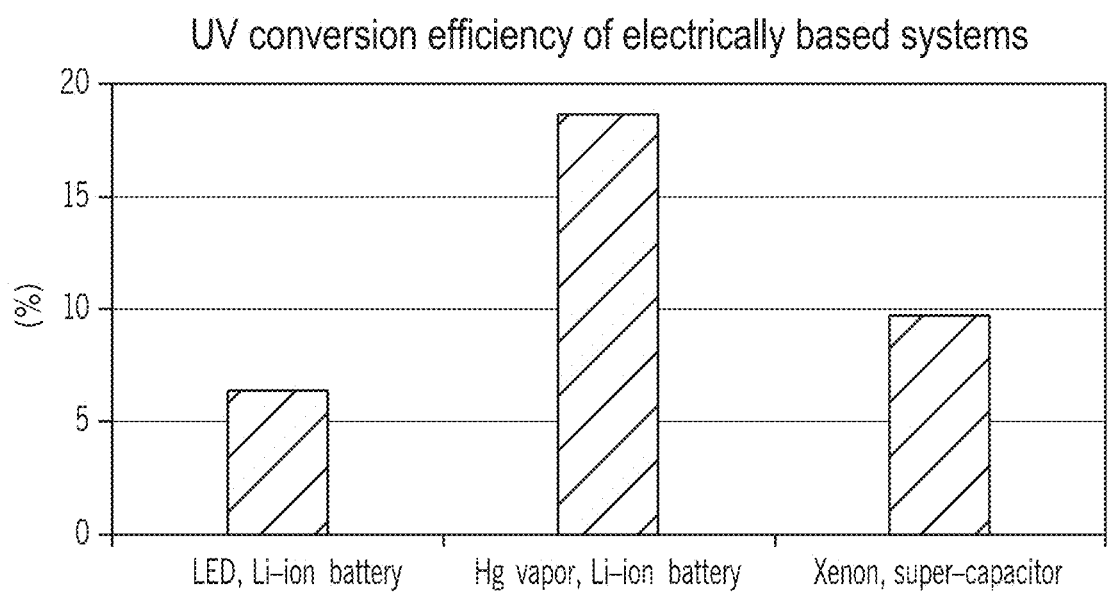
FIG. 5 shows a histogram of UV conversion efficiency, electrically based systems.

Total conversion efficiency of the mercury vapor system is higher than the others by 2-2.5 times (SEE FIG. 5). This is primarily due to the 35% conversion efficiency of the mercury lamp. The LED system has the lowest total efficiency due to the 3% efficiency of the LED lamps.

Figure 6:
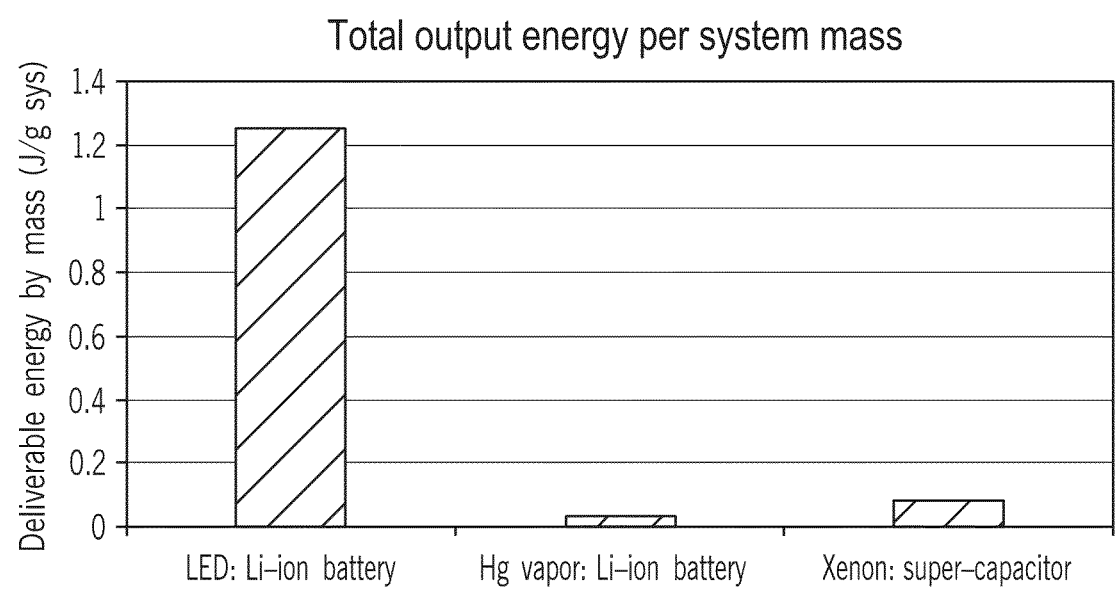
FIG. 6 shows a histogram of total output energy per system mass.

The unconverted electrical energy that each type of system can store and deliver to its UV lamp was determined (SEE FIG. 6). Both the mercury vapor lamp and LED system use the same lithium ion battery but they have significantly different characteristics. LED lamps are lightweight and require little other than wires and a rudimentary mounting system such as a PC board. A mercury vapor lamp has a relatively heavy glass envelope and requires a transformer. These add significantly to the overall system mass that its specific output is 25 times less than the LED system. The xenon strobe system weighs considerably less than the mercury system but the xenon tube's efficiency is only 10% which reduces its specific energy to 0.1 J/g.

Figure 7:
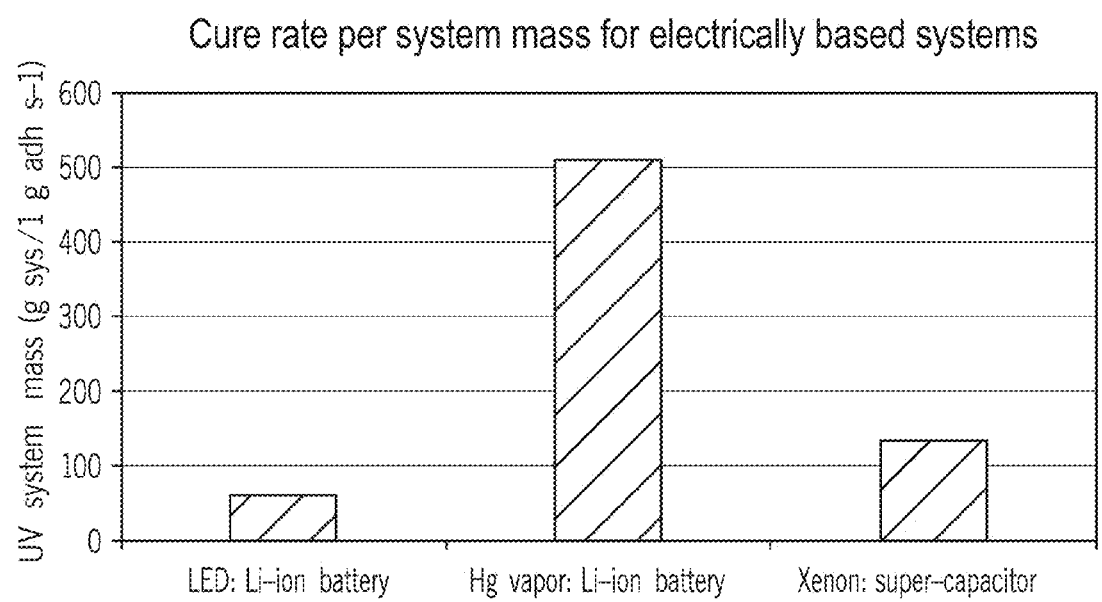
FIG. 7 shows a histogram of cure rate per system mass for electrically based systems.

Combining conversion efficiency with specific output provides a more tangible view of a systems performance. Experimental results indicate that curing an acrylic adhesive requires a minimum of 5 J per gram of adhesive. System mass required to cure 1 g of composite per second was determined (SEE FIG. 7). The high mass of the mercury vapor lamp offsets the efficiency of its lamp such that it requires over ½ kg of equipment to cure 1 g of composite. A time constraint of grams cured per second is required since system size is highly variable depending on power output.

Figure 8:
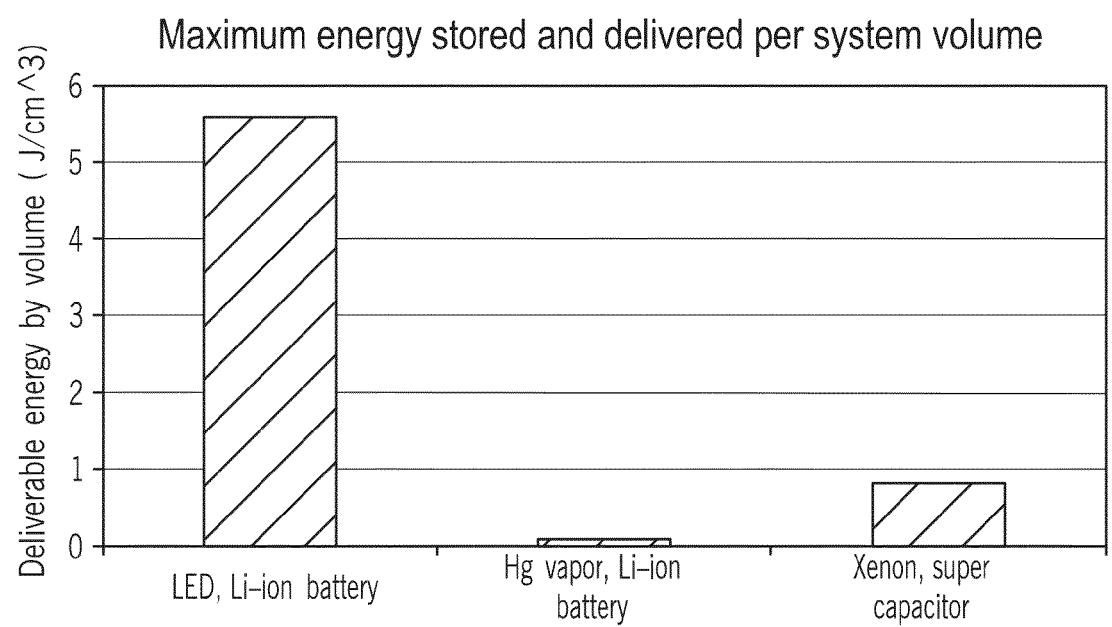
FIG. 8 shows a histogram of the maximum energy stored and delivered per system volume.

The LED system, with its relatively small components, is the most compact system of the three electrical systems. The LED system can deliver about 30 times more energy per $cm^3$ volume than the mercury vapor lamp (SEE FIG. 8). The super capacitor of the xenon system, while lightweight, is fairly large and results in 0.9 J per $cm^3$ volume.

Figure 9:
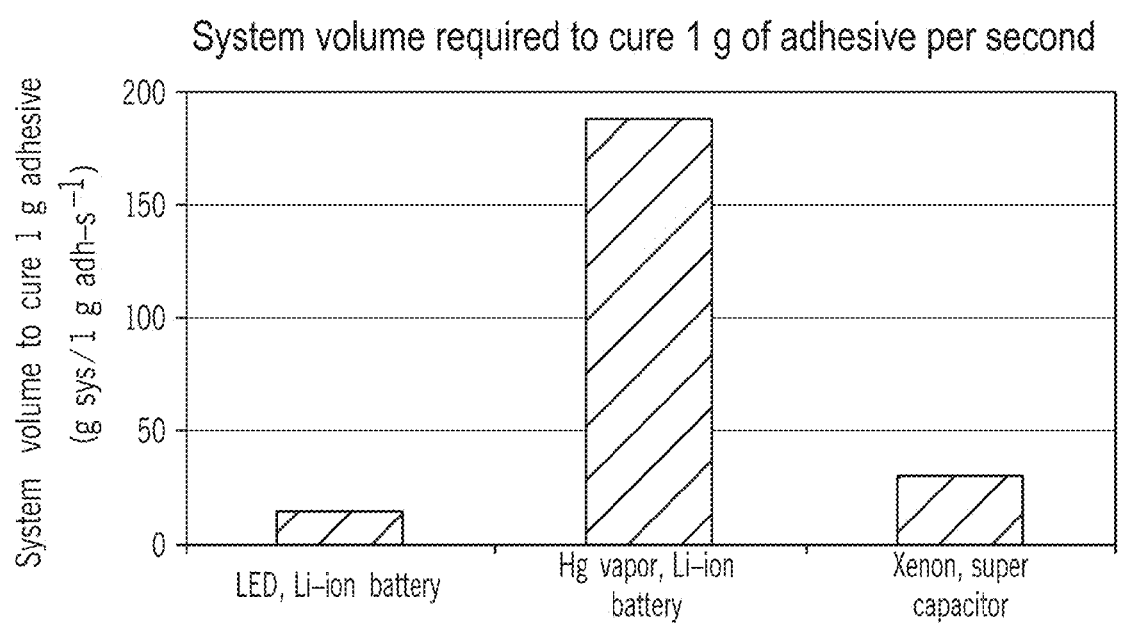
FIG. 9 shows a histogram of system volume required to cure 1 g of adhesive per second.

The system volume required to cure 1 g of adhesive per second was tested (SEE FIG. 9). The high efficiency of the mercury lamp doesn't offset its large volume and the system requires over 180 cm3/g adhesive per second. The compact LED system requires less than 20 cm3/g s. The xenon strobe and super-capacitor has a low system volume of 35 cm3/g s. This is not due to its compact size but due to its high power output. It is not limited by lamp overheating as the LED system or by transformer saturation as is the mercury vapor system.

Figure 10:
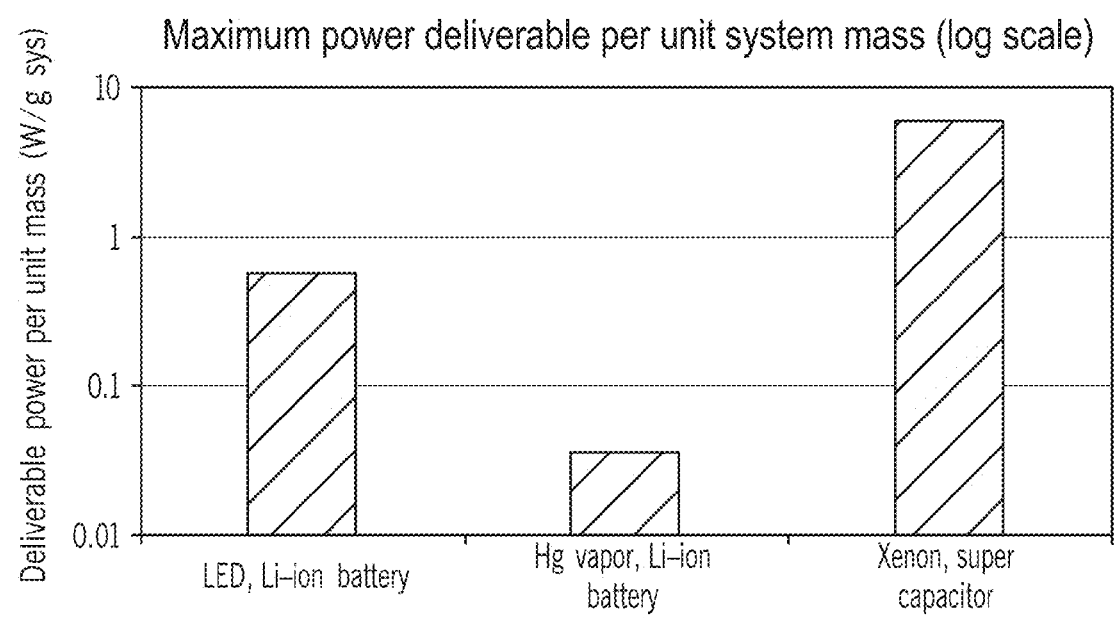
FIG. 10 shows a histogram of maximum power deliverable per unit system mass. (log scale).

The power output of the xenon system is 10 times higher than the LED system and 100 times larger than the mercury vapor system (SEE FIG. 10). The xenon system is capable of 6 W per g.

Comparison, Electrical UV Systems.

Figure 11:
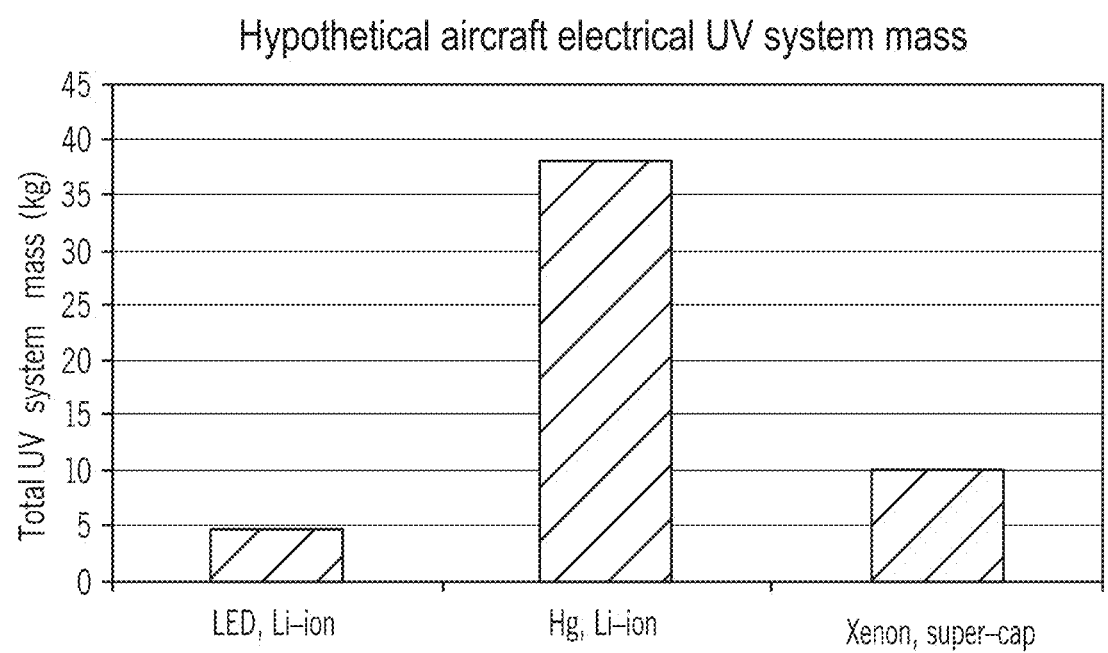
FIG. 11 shows a histogram of hypothetical aircraft, electrical UV system mass.
Figure 12:
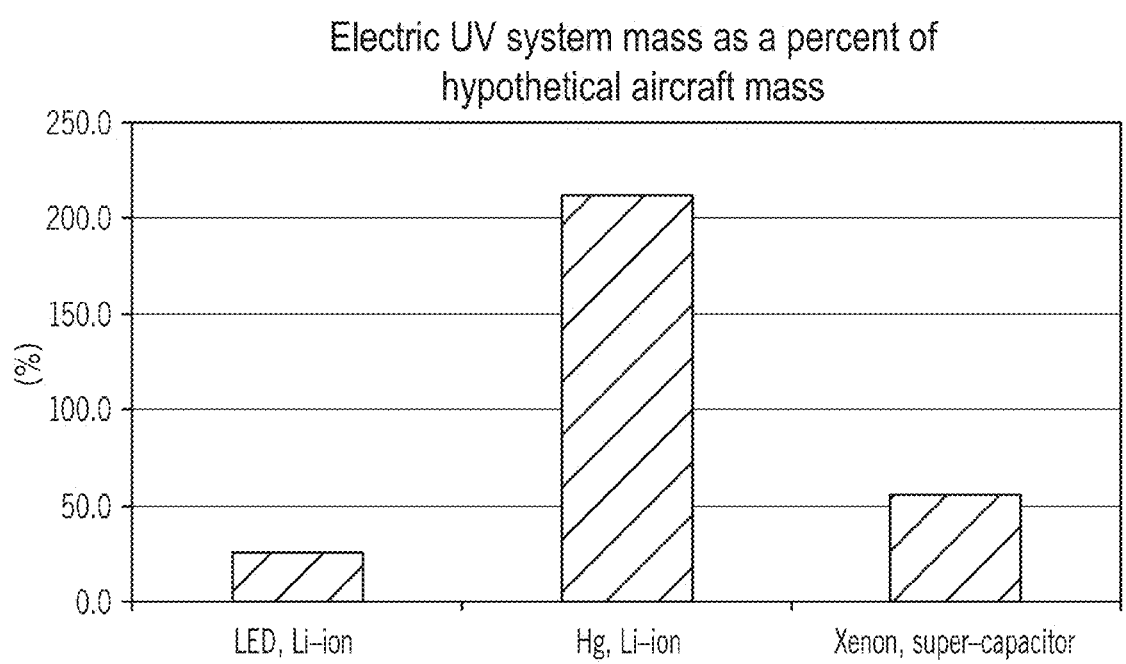
FIG. 12 shows a histogram of electric UV system mass as a percent of hypothetical aircraft mass.
Figure 13:
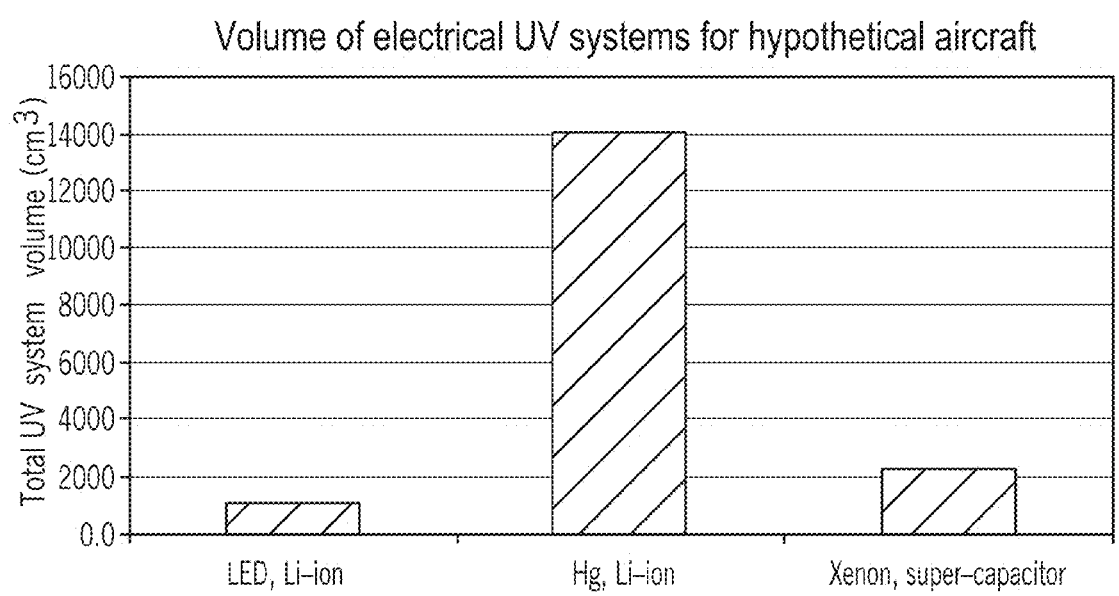
FIG. 13 shows a histogram of volume of electrical UV systems, hypothetical aircraft.
Figure 14:
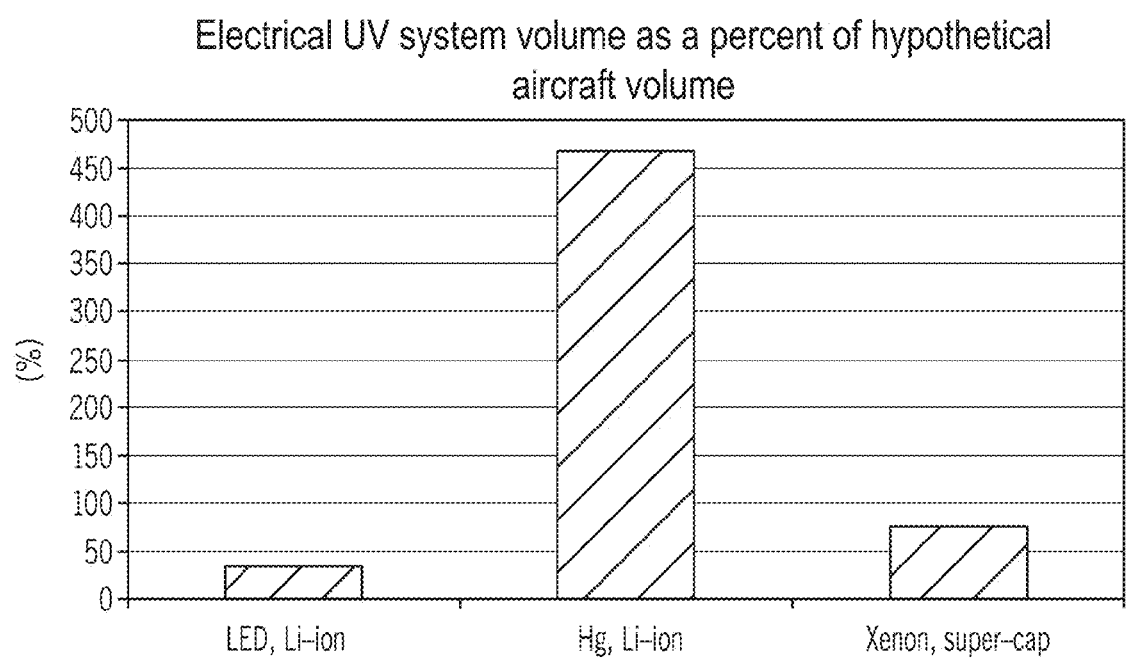
FIG. 14 shows a histogram of electrical UV system volume as a percent of hypothetical aircraft volume.

Effectiveness of each technology as applied to curing the wing structure of a hypothetical aircraft with a 2 m wingspan, a gross weight of 18 kg and fuselage volume of 3 L, was tested (SEE FIGS. 11 and 12). The aircraft wings contain a total of 75 g of adhesive which, at 5 $J/g_{adh}$, require 375 J of energy to cure. The mercury vapor system requires 36 kg of mass (2 times the total aircraft mass) to cure the adhesive. The 10 kg xenon super-capacitor system weighs just over ½ the total aircraft weight and the LED system weighs 5 kg. The total volume required for the curing systems and the corresponding percentage of the total aircraft usable volume was determined (SEE FIGS. 13 and 14). The largest system is the mercury vapor lamp with a requirement for over 14,000 $cm^3$ of volume. The other systems are significantly smaller at 2,200 $cm^3$ and 1000 $cm^3$.

The comparison of electrically-based UV-generating systems demonstrates that the mercury vapor lamp exceeds both the maximum aircraft weight and its maximum volume by a substantial amount, and thus cannot be used. The xenon strobe system requires over half of the aircraft mass and ⅔ of its volume which, based on current aircraft design, is extremely unlikely to be available. The LED system requires roughly 25% of the aircraft mass and volume which is technically feasible but still significantly impacts the fuel and scientific payload. Electrically-powered UV-generation systems with currently available technology are not capable of generating sufficient UV light for the present invention.

Chemical UV Source.

Experiments conducted during development of the present invention demonstrated that preferred embodiments of the present invention require UV light source with an energy density that is at least an order of magnitude greater than the Lithium-ion LED system. Some exothermic chemical reactions are potent UV sources that are capable of providing the required power output. The combustion reaction of a metal such as magnesium with oxygen is well documented as being vigorous, highly exothermic and producing large quantities of brilliant white light. Light output from magnesium combustion spans the middle UV region, about 50-350 nm (e.g. 200-300 nm) through all visible wavelengths and terminates in the infrared at approximately 4000 nm.

Figure 15:
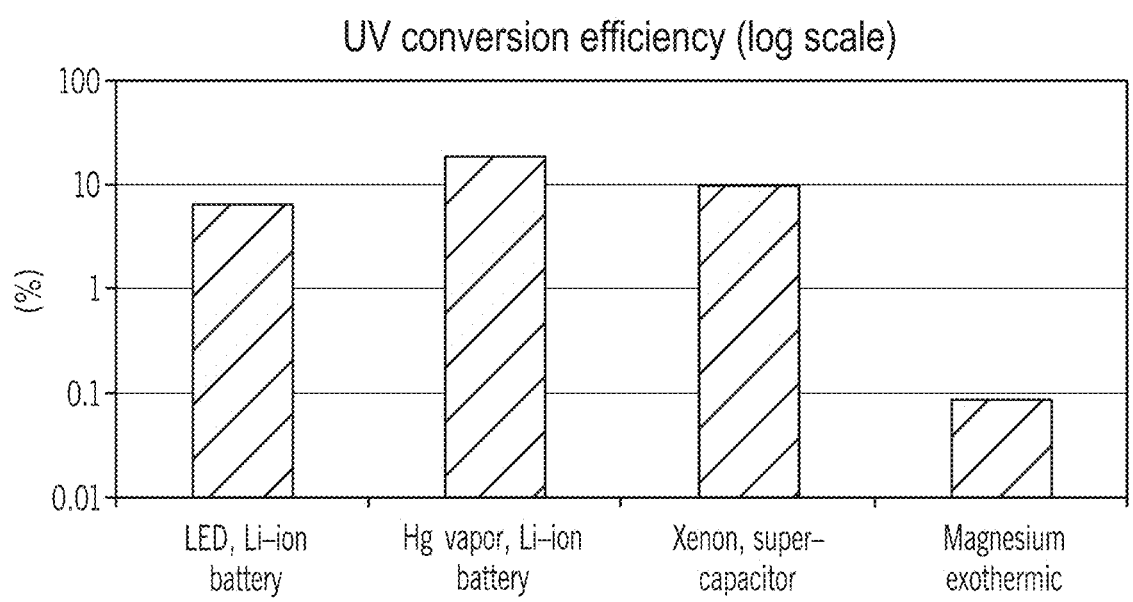
FIG. 15 shows a histogram of UV conversion efficiency (log scale).
Figure 16:
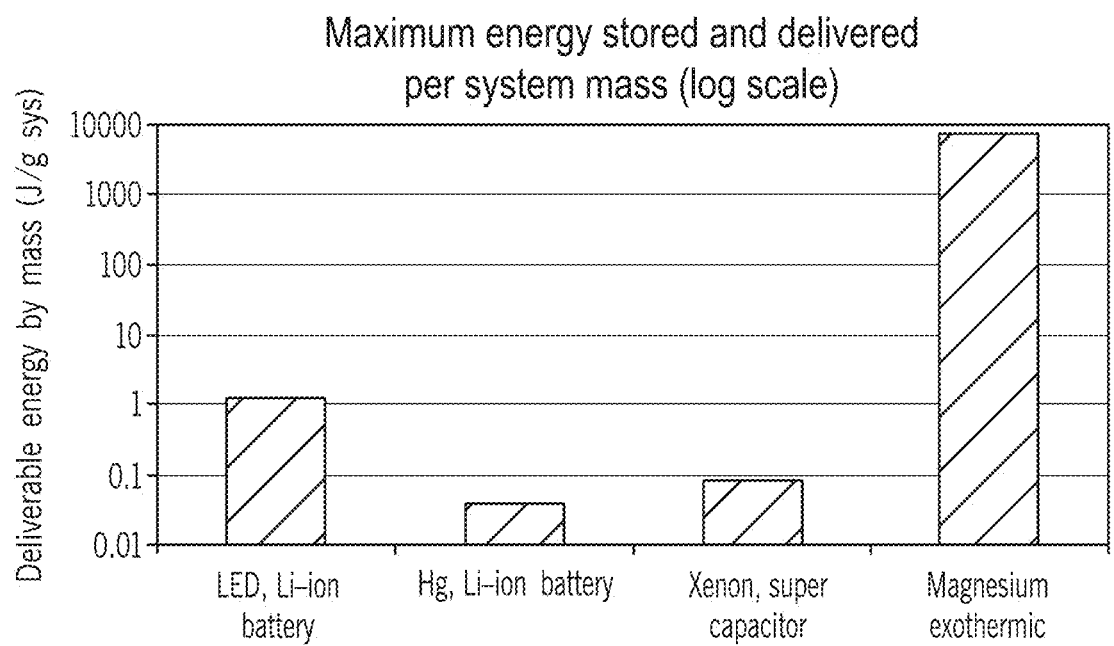
FIG. 16 shows a histogram of maximum energy stored and delivered per system mass (log scale).
Figure 17:
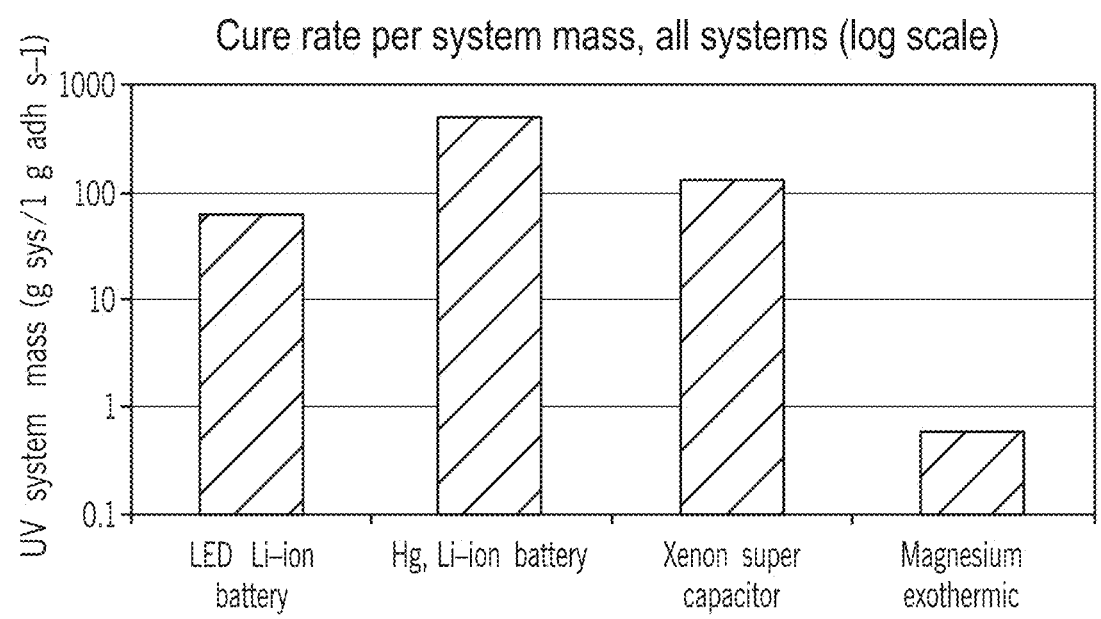
FIG. 17 shows a histogram of cure rate per system mass, all systems (log scale).
Figure 18:
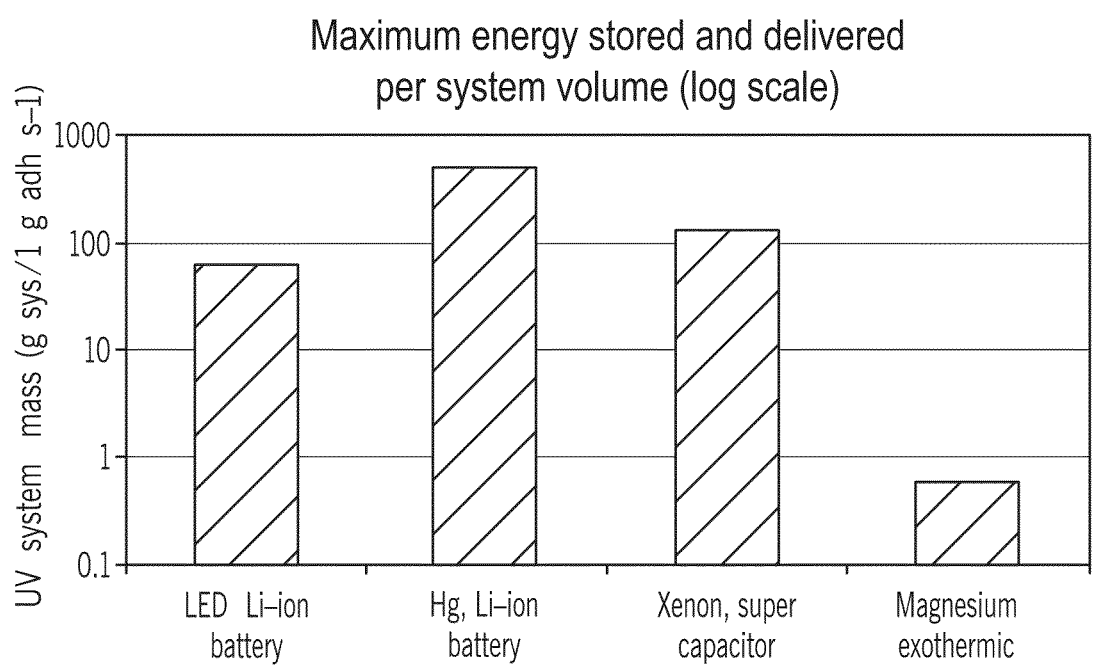
FIG. 18 shows a histogram of maximum energy stored and delivered per system volume (log scale).
Figure 19:
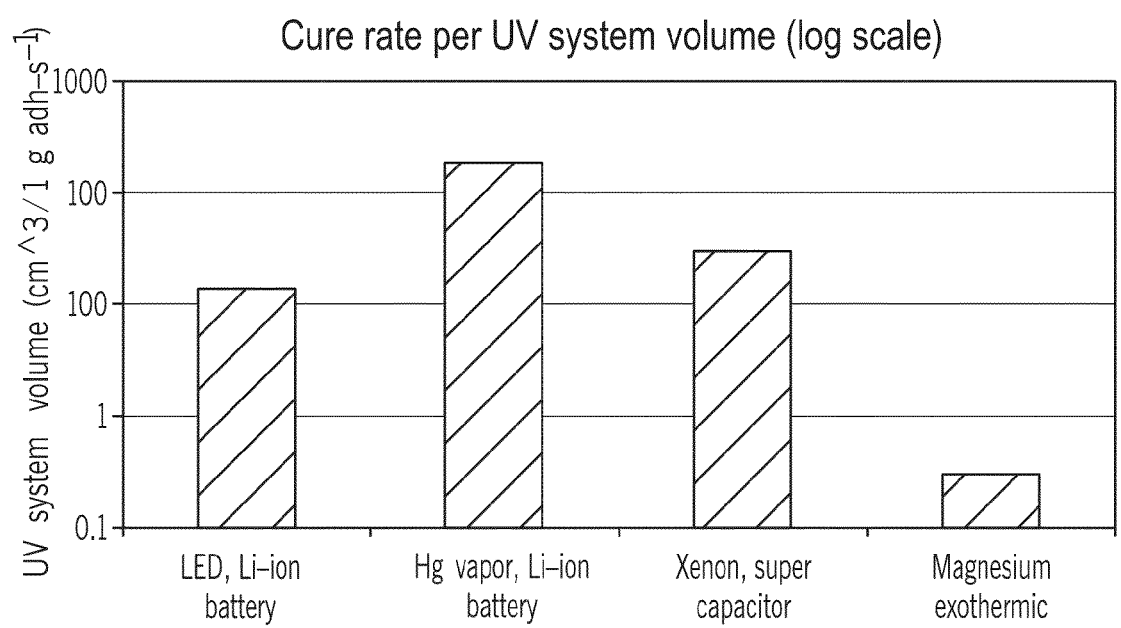
FIG. 19 shows a histogram of cure rate per UV system volume (log scale).
Figure 20:
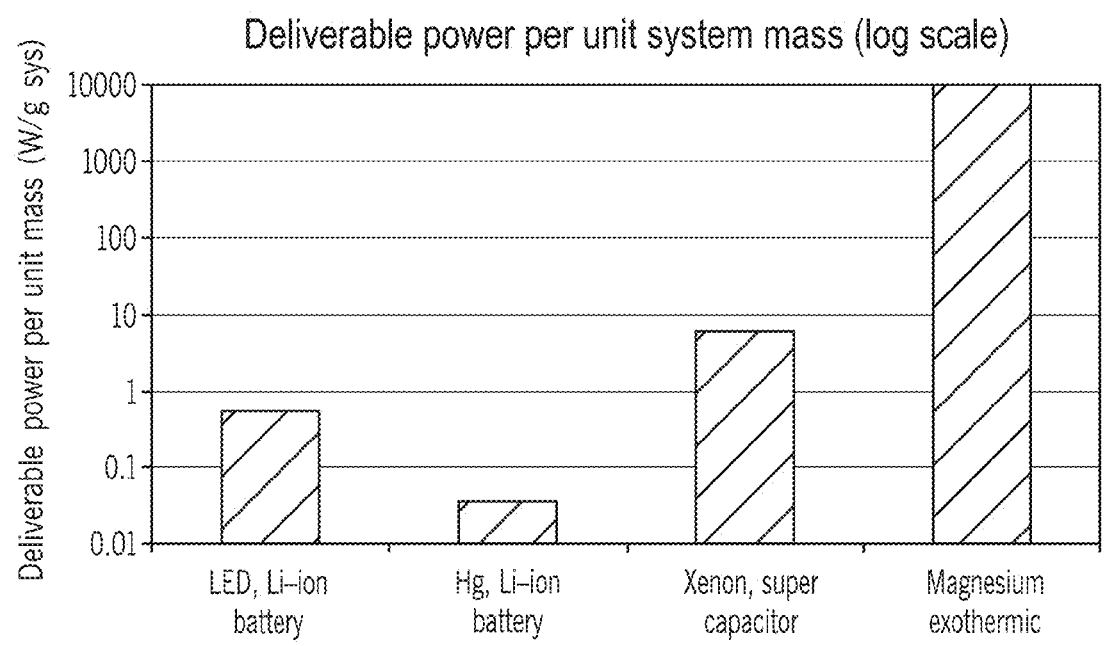
FIG. 20 shows a histogram of deliverable power per unit system mass (log scale).

Based on experimental conducted during development of embodiments of the present invention, the UV conversion efficiency of magnesium combustion is 0.085%. The conversion efficiency of magnesium combustion is 2 orders of magnitude less efficient than LED, the least efficient electrical system (SEE FIG. 15). Though the UV conversion efficiency is very low, the high energy density of a chemical reaction results in a total UV output that is significantly higher than any electrochemical means. The total energy delivered from the combustion of 1 g of magnesium is 4 orders of magnitude greater than the most energy dense electrical system (LED) and 6 orders of magnitude greater than the least dense system (Hg lamp) (SEE FIG. 16). Magnesium's energy density is boosted by the requirement for very few additional components to form a complete UV generation system. Rather than having a discrete lamp, wires and battery, the combustion system contains metallic magnesium combined with a suitable solid oxidizer and a simple support structure to hold the two materials. The mass specific material curing rate of the magnesium combustion system is 2 orders of magnitude higher than the lightest electrical UV system (SEE FIG. 17). The absence of additional components results in a very low system volume for the magnesium combustion system. Magnesium's energy per specific volume is 3 orders larger than the highest rated electrical system (LED) and 5 orders higher than the lowest rated system (Hg lamp) (SEE FIG. 18). The magnesium system has a high energy density, as the volumetric requirement is ½ $cm^3$ per g adhesive per second which is approximately 40 times smaller than the LED system and 400 times smaller than the Hg lamp system (SEE FIG. 19). Magnesium's power output is directly related to its speed of combustion which is, in turn, controlled by its surface area. Power output can thus be tailored over a wide range by increasing or decreasing its surface area. Fabrication techniques were developed that can raise magnesium's power output to approximately 10 kW/g. Magnesium's 10 kW output is over 3 orders of magnitude higher than the xenon strobe system (SEE FIG. 20). The specific system mass and volume of the magnesium combustion UV system is 3 orders of magnitude smaller than the most competitive electrically based system. These characteristics allow the magnesium combustion system to cure 100 times more adhesive per unit weight and 50 times more adhesive by unit volume than the most competitive electrically powered UV generation system.

Comparison of all UV Systems.

Figure 21:
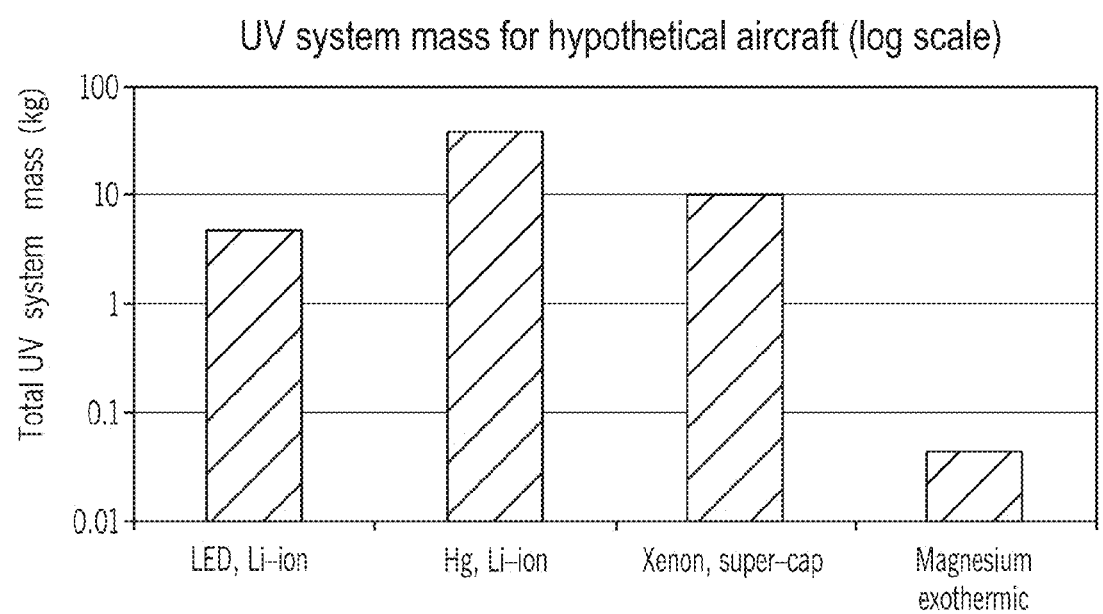
FIG. 21 shows a histogram of UV system mass, hypothetical aircraft (log scale).
Figure 22:
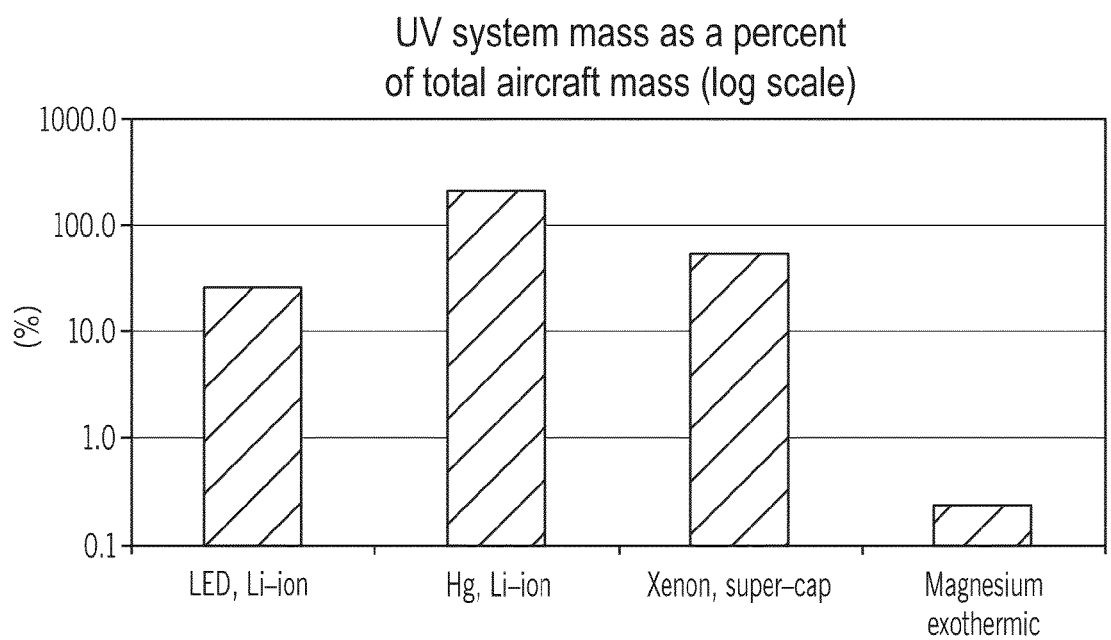
FIG. 22 shows a histogram of UV system mass as a percent of total aircraft mass (log scale).
Figure 23:
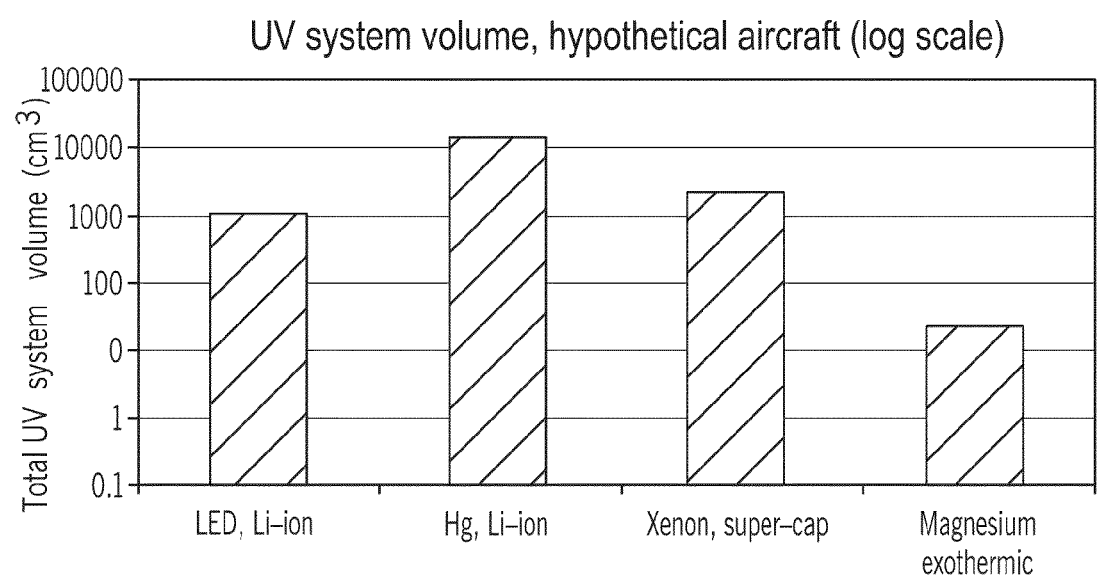
FIG. 23 shows a histogram of UV system volume, hypothetical aircraft (log scale).
Figure 24:
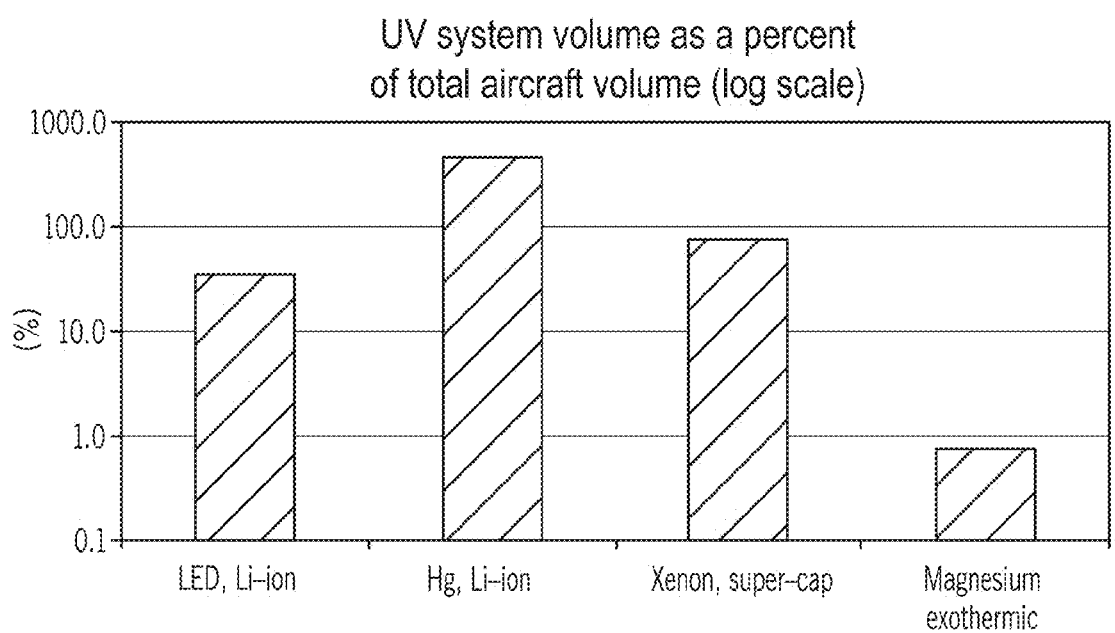
FIG. 24 shows a histogram of UV system volume as a percent of total aircraft volume (log scale).

Integrating a magnesium UV generation system with the same hypothetical aircraft model provided comparison of the exothermic system with the electrically based systems. The total mass of the magnesium system needed to cure 75 g of adhesive is approximately 40 g as opposed to the 5000 g LED system (SEE FIG. 21), corresponding to 0.2% of the total aircraft mass (SEE FIG. 22). The total aircraft volume occupied by the magnesium system is 20 $cm^3$ which is approximately 50 times less than the LED system and 500 times less than the Hg lamp system (SEE FIG. 23). The magnesium system consumes less than 1% of the total volume in the aircraft (SEE FIG. 24).

Example 2

Wing Structure and Deployment

Figure 25:
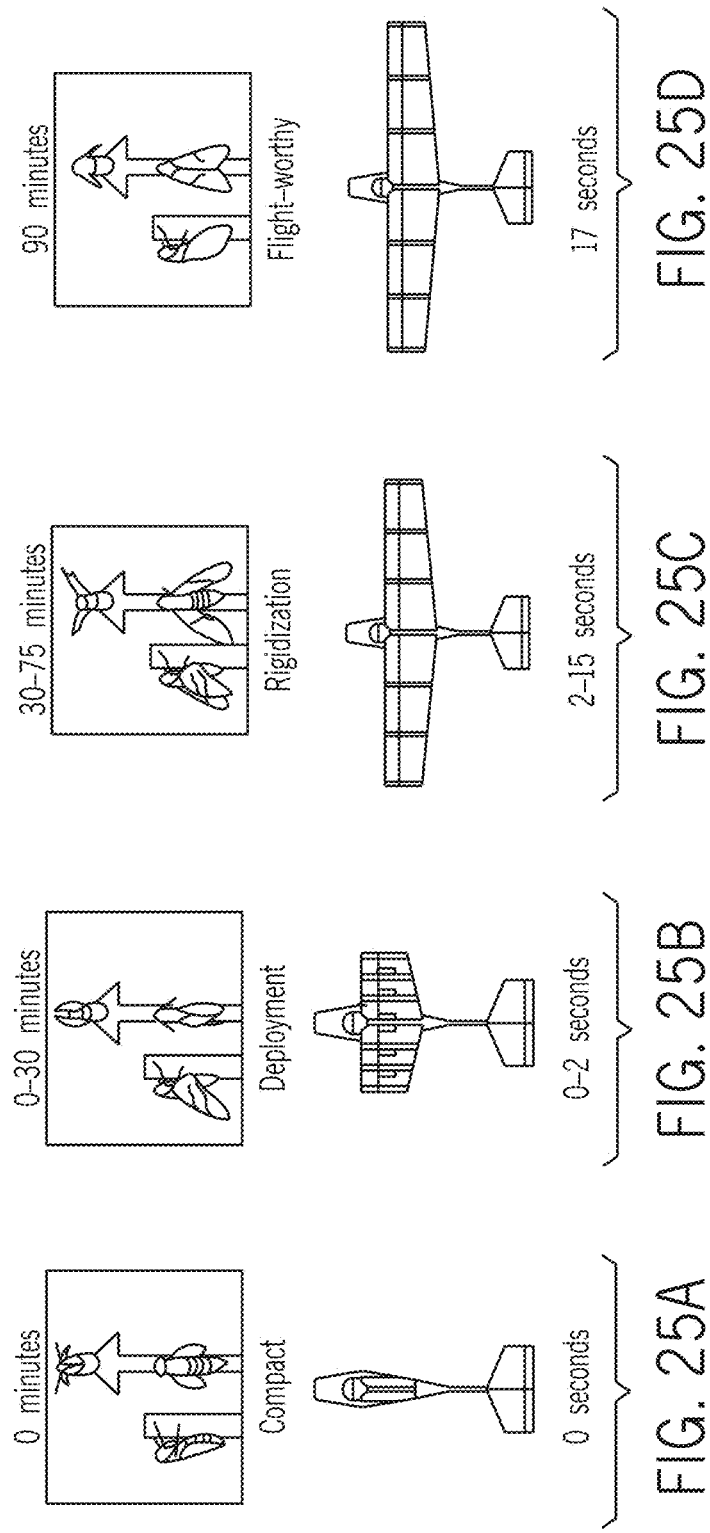
FIG. 25A-D shows a schematic of wing deployment of a Manduca Sexta compared to the wing expansion of an exemplary aircraft of the present invention.
Figure 26:
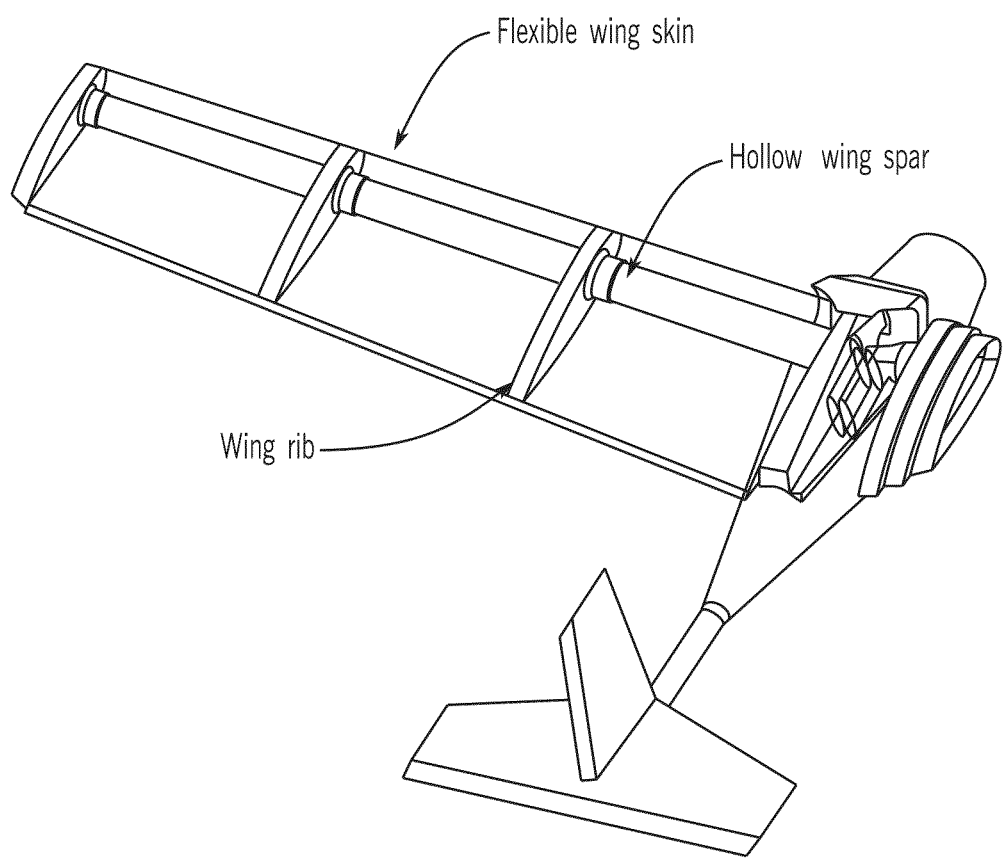
FIG. 26 shows a schematic view of an exemplary wing design utilizing an inflatable and rigidizable support element of the present invention.

In some embodiments, the present invention provides a wing design based on the mechanics of the Manduca sexta moth wing. There are both similarities and differences. The wing design provides utility in a variety of aerial vehicles including, but not limited to commercial aircraft, military aircraft, experimental aircraft, recreational aircraft, lunarcraft, spacecraft, and particularly unmanned aerial vehicles (UAV). The sequence of wing deployment of the Manduca Sexta moth matches with the deployment sequence of an exemplary UAV wing (SEE FIG. 25). A UAV having a greater mass than the moth requires a longer wingspan that is efficient in soaring flight, and requires an airfoil shape to generate lift with low drag. In some embodiments, the airfoil has an upper and lower wingskin in contrast to the single membrane of the moth wing. In some embodiments, the UAV wingskin is made of a flexible fabric stretched taut over the wing structure (SEE FIG. 26). Ribs shaped to the airfoil profile support the fabric. The ribs are the only component of the wing that are pre-stiffened. They are widely spaced and vary in size therefore can nest inside of one another at near maximum density. The ribs and fabric are supported on one or more hollow load-bearing wing spars that are anchored in the fuselage of the aircraft. These wing spars, analogous to the Manduca's wing veins, are initially flexible and are folded in between the nested ribs as depicted in the UAVs starboard wing. In some embodiments, the wing spars comprise inflatable and rigidizable support elements of the present invention.

Figure 27A:
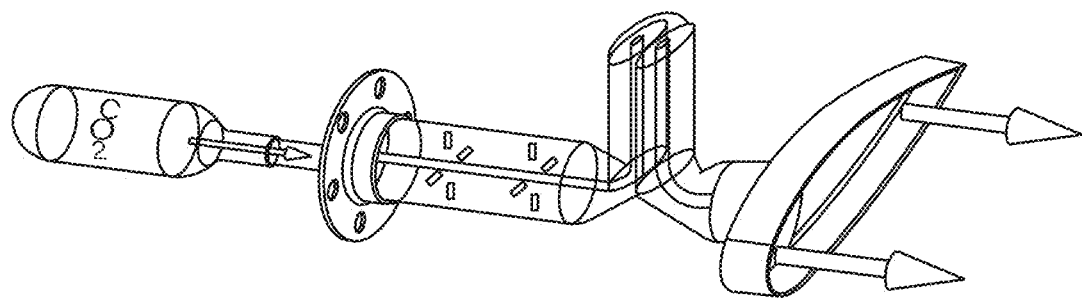
FIG. 27 shows a schematic of 3 discrete steps of the wing deployment process: 1) inflation (FIG. 27A), 2) internal reaction (FIG. 27B), and 3) rigidization and load bearing (FIG. 27C).
Figure 27B:
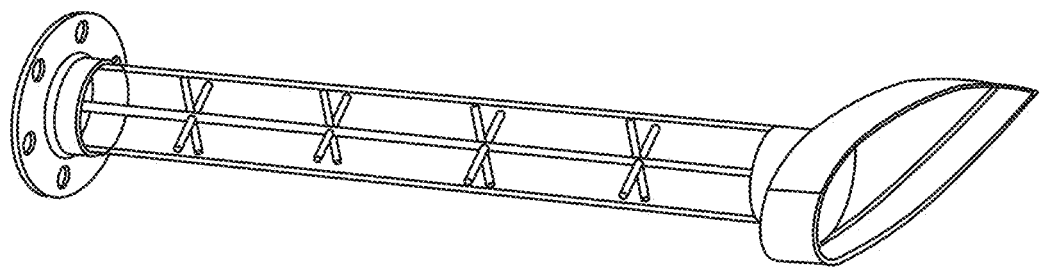
Figure 27C:
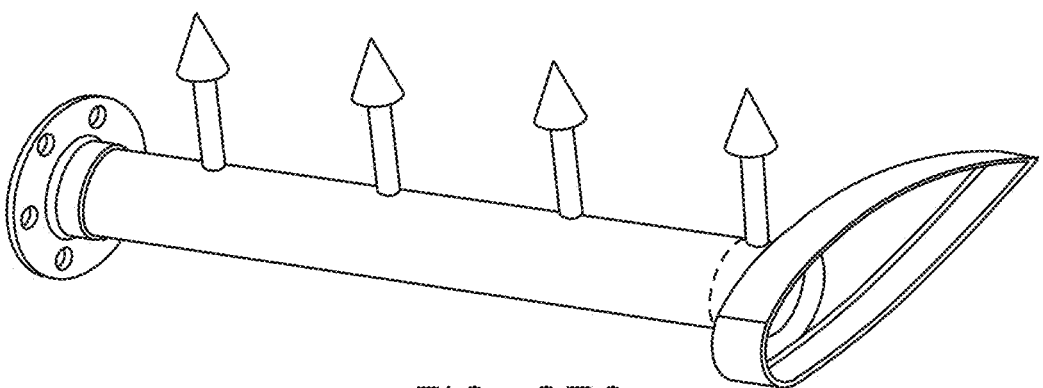

Transportation of the UAV could occur with its wings folded into their dense stowed position. The deployment of this UAV wing begins with a gas (e.g. $CO_2$) filling and pressurizing the folded support element thus extending itself, the ribs and the wing fabric out to its full length. After extension the support element is rigidized using any rigidization procedures described herein. The final result is a stiff tubular support element capable of supporting the wing under the loads generated during flight (SEE FIG. 27).

Example 3

Support Element Design

The following is an exemplary embodiment of the present invention which should be viewed as illustrative or potential embodiments, and not limiting the scope in any way.

Structural Fiber.

In some embodiments, UV adhesives require exposure to direct radiation for an effective cure. Composite material using this adhesive is preferably transparent to the particular wavelength. An opaque fiber material (such as carbon fiber) undergoes complete curing on the side exposed to light and unexposed adhesive on the shielded side remains uncured. Common E-grade glass is transparent to near UV but begins blocking wavelengths of 360 nm. KEVLAR is opaque to UV and polyimide is damaged by UV (DuPont Advanced Fiber Systems, "Kevlar Aramid fiber Technical Guide," Vol. H-77848, 2000; herein incorporated by reference in its entirety). Fused-quartz glass provides a highly suitable structural fiber for UV transmission. Unlike conventional electrical grade borosilicate fiberglass (E-glass), quartz is transparent to UV above 270 nm (Heraeus Noblelight Ltd, "UV Lampbook technical product guide," 2004; herein incorporated by reference in its entirety). Quartz fiber is also a suitable structural material due to its high tensile strength of 3600 MPa and 78 GPa modulus (Saint-Gobain Quartz S.A.S., "Quartzel Technical guide to Fused Quartz Textiles," 2004; herein incorporated by reference in its entirety).

Combustion Based UV Generation.

Acrylic adhesive utilizes exposure to UV energy from 200-400 nm at an energy level greater than 5 J per gram of adhesive for curing. Existing UV systems use large quantities of electrical power that would require the high associated mass of batteries, lamps and support hardware, making it too heavy for a UAV application. Batteries also suffer from severe drop in performance at low temperatures. There are a number of exothermic chemical reactions that produce UV light. These processes can produce a suitable level of UV radiation in a remote environment, with no power supply and severe weight limitations, and store orders of magnitude more energy than electrochemical batteries. The combustion reaction of a pyrophoric metal such as magnesium with oxygen is well documented as being vigorous, highly exothermic and producing large quantities of brilliant white light (Summersfield, M. Progress in astronautics and rocketry, Vol. 1, Academic press, New York, 1960, pp. 692; herein incorporated by reference in its entirety). While combustion does not produce a continuous spectrum, light output spans from the middle UV region through all visible wavelengths and terminates in the infrared at approximately 4000 nm (Wolfhard. Progress in astronautics and aeronautics, Vol. 15, Academic Press, New York, 1964, pp. 765; herein incorporated by reference in its entirety). Existing literature lacks data on the specific UV power of magnesium combustion.

Experiments were conducted during development of embodiments of the present invention to evaluate the performance of magnesium as a UV source. The UV produced by magnesium ribbon samples combusting in the atmosphere was measured using a calibrated silicon carbide sensor sensitive over 200-400 nm. These experiments showed a UV conversion efficiency of approximately 0.083%.

Combustion and Mechanical Requirements.

The fiber/adhesive matrix tube is preferably exposed to a uniform UV field to cure it evenly. If the composite is not uniformly cured it will be more susceptible to failure, particularly in compression. A combustion zone traveling the full length of the tube's center axis provides uniform exposure to the tube walls assuming that the light source has an omnidirectional pattern. Therefore a co-axial rod-like magnesium element was developed that combusts linearly from end to end.

The curing of the acrylic is hindered by free oxygen, thus an inert gas is used for inflation. In addition, free oxygen in the tube during the combustion process allows secondary combustion of nearby polymers. The metallic magnesium is therefore burned in the presence of a solid oxidizer. A stoichiometric quantity of solid oxidizer releases pure oxygen in the immediate vicinity of the combustion zone, providing more rapid and complete combustion while maintaining a very low oxygen environment in the rest of the tube. Potassium perchlorate ($KClO_4$) was chosen as the conventionally available oxidizer having the highest oxygen content.

The coaxial combustion element located along the full length of the composite tube should be flexible to conform to the tubes initial folded configuration without permanent bending and also be capable of resuming its straight shape during deployment. This is accomplished with an arrangement of wires or strips capable of a tight bending radius without plastic deformation of the magnesium. The thin element is supported and held co-axially with a consumable stent-like scaffold of thin UV transparent polyester film. The scaffold, which is collapsed in the folded configuration, springs open to center the element during deployment.

Figure 28A:
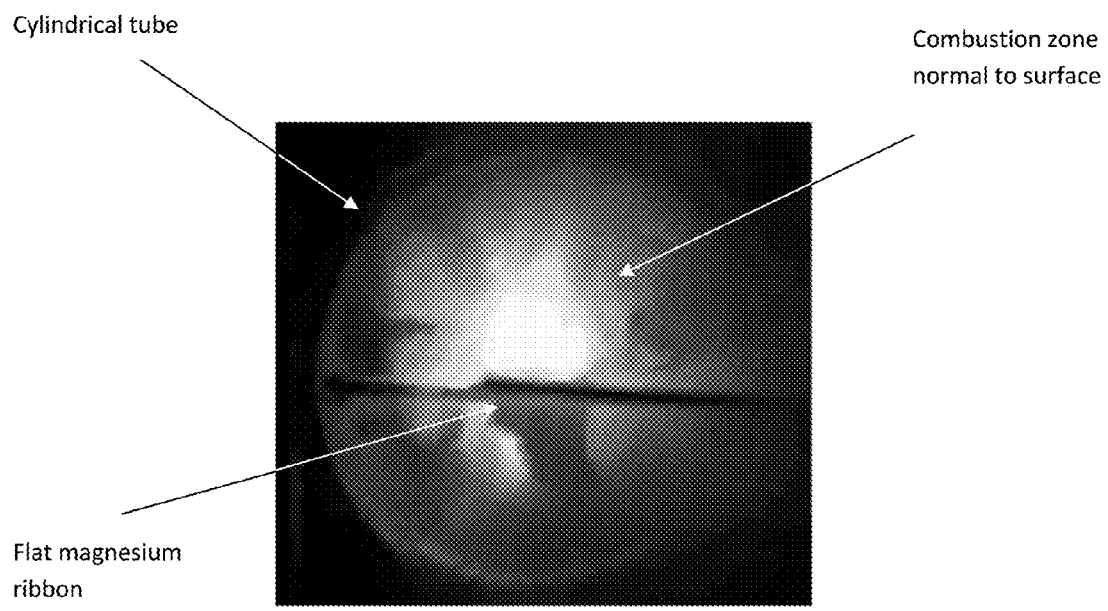
FIG. 28 shows an image of the axial view of combustion of flat strip (FIG. 28A) and braided magnesium tube (FIG. 28B).
Figure 28B:
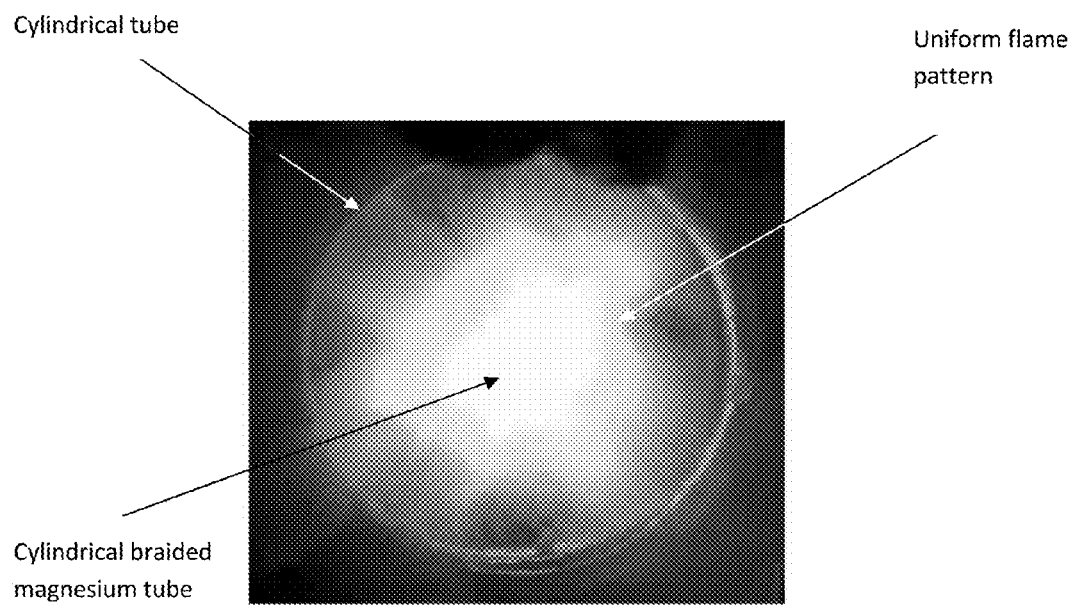

Combustion experiments were conducted in a cylindrical tube simulating the wing beam. The cylindrical tube was flushed with nitrogen gas to produce an inert gas environment. Initial experiments with flat magnesium ribbon coated with a stoichiometric quantity of $KClO_4$ resulted in an increase of combustion speed by 8 times relative to earlier combustion experiments in ambient air. The shape of magnesium element underwent changes during development to produce reliable and consistent combustion, to generate a uniform flame pattern, and maintain flexibility. The initial flat strip element exhibited good flexural properties and combusted reliably. It produced a combustion zone that was biased normal to its surface resulting in an uneven radiation pattern (SEE FIG. 28A) and highly localized heating of the test cylinder. The final configuration was a cylindrical tube of thin braided magnesium ribbon that provided a uniform flame pattern (SEE FIG. 28B).

Figure 29A:
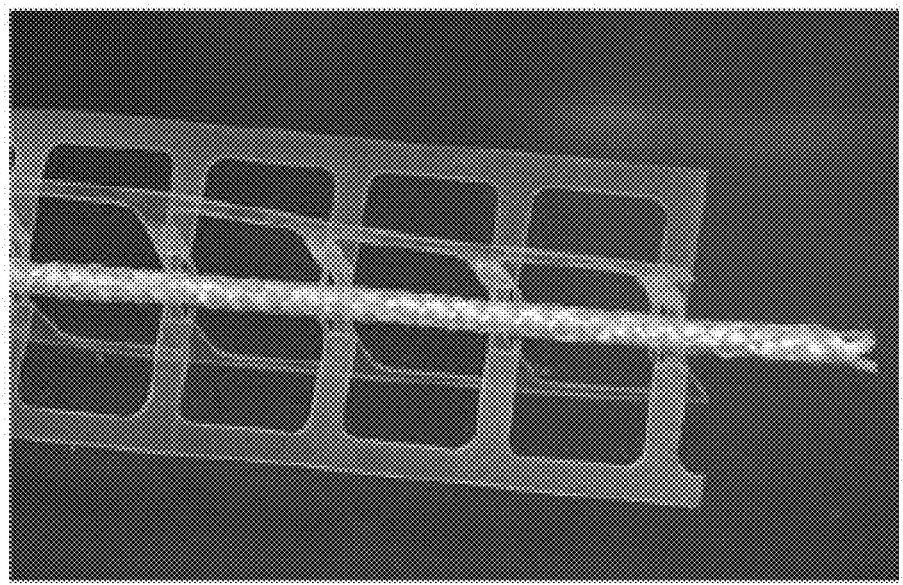
FIG. 29A-B shows an image of a flexible braided magnesium tube and polyester centering scaffold.
Figure 29B:
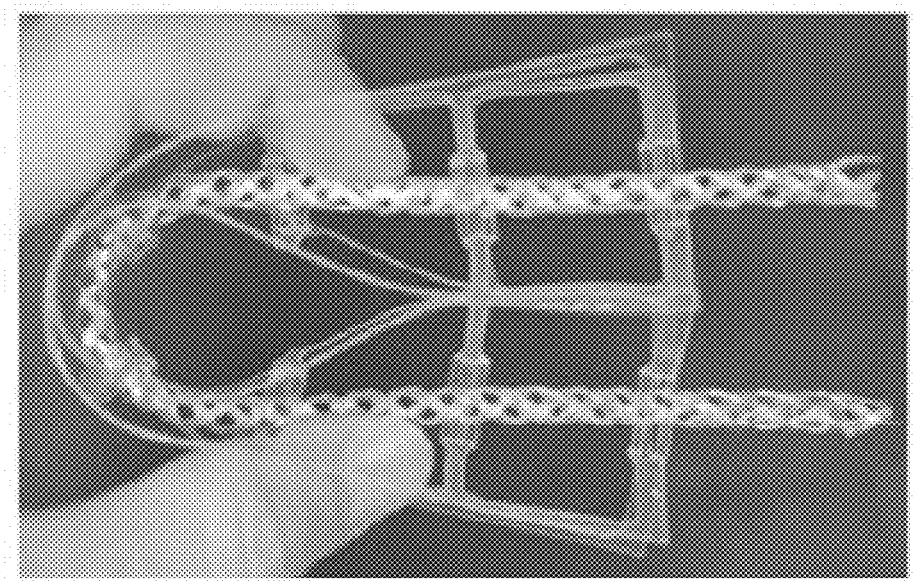

The braided tubular configuration met all of the combustion and mechanical requirements. In addition the oxidizer can be contained within the tube (SEE FIG. 29A). The cylindrical element is highly flexible and can be bent in any direction depending on the packing requirements of the wing tube (SEE FIG. 29B).

Tube Design.

Options for the tubular composite wing spar include woven fabric, a braided tube or a combination of both. A woven fabric with axial and circumferential fibers is best for handling the loads generated during flight. The tensile/compressive forces are directed into the axial fibers and the circumferential fibers resist hoop stress during inflation and Euler buckling during flight. A braided tube with fibers oriented +/-45 deg to the axis is best for resisting torsional loads generated from control surface modulation and wing twisting resonances. A hybrid tube utilizing an outer and inner layer of woven fiber separated by a braided core can produce a structure suited to both types of loading.

The composite tube is made of porous fabric and may not maintain the inflation pressure. An internal pressure bladder made of thin UV transparent polyester film lines the quartz fabric tube. During inflation this bladder expands outwards and expands the fabric tube into its final shape. The composite tube is strongest if it is uniformly cylindrical. It is encased in an outer sleeve of a high-strength seamless polyimide film to maintain shape. The inner and outer sleeves constrain the fiber and adhesive to a cylindrical shape as it is being cured. An electrically conductive outer UV shield layer is comprised of aluminized polyimide film.

Multipurpose Inflation System.

The inflation system serves to deploy the wing tube, transport the highly UV reflective magnesium oxide combustion product from the tube interior and cool the adhesive and polymer materials during combustion. The proposed deployment utilizes a high volume of low-pressure gas that is provided by a compressed gas reservoir, a combustion gas generator or a combination of the two. In some embodiments, $CO_2$ is used as it is stored under pressure as a high-density liquid. A pressure regulator at the wing tube outlet maintains the above atmospheric inflation pressure while allowing a large flow of gas.

Thermal Regulation.

With a UV conversion efficiency of 0.083%, one gram of magnesium releases nearly all of its 10.6 kJ of energy in the visible and IR region. While quartz fiber has a working temperature of 1050° C., the polymer materials have melting or decomposition temperatures ranging from 190° C. (adhesive), 250° C. (polyester) to 520° C. (polyimide). Thus it was determined if the tube materials require some form of active cooling. Due to the high combustion temperature of magnesium, the majority of the heat transferred to the polymer materials is by radiation. The peak temperature of the composite can be approximated by accounting for the thermal mass, absorptivity coefficient, and dose of thermal radiation.

A 2-D radiative model was based on the average geometry and combustion power levels from the magnesium element experiments. Physical properties of the composite material such as mass, density and specific heat are the based on the 30% adhesive to fiber ratio. Assuming that the thermal radiation is focused in a 1 mm thick disk traveling down the tube axis at 17.5 mm/s, the sample wall area is subjected to 20 J/cm2. This raises an initially 25° C. composite sample to a final temperature of 200° C. This exceeds the decomposition temperature of the acrylic adhesive. Thus a solution is preferred to maintain the polymers' sufficiently below their degradation temperatures.

Due to an instantaneous thermal input rate ranging from 1-10 kW/cm2 typical methods of active wall cooling are ineffective. A calculated conductive heat flux of ~0.2 W/cm2 through the composite tube walls rules out any external radiative or convective cooling methods. Even with the inflation gas providing fully turbulent flow the internal convective cooling was calculated to be ~3.7 $W/cm_2$. An alternative cooling method takes advantage of the fact that a CO2 inflation gas stored as a compressed liquid has a −78° C. flash temperature. By initially cooling the composite to this temperature, its thermal inertia alone would reach a maximum final temperature of 97° C.

Example 4

Design Validation

Figure 30:
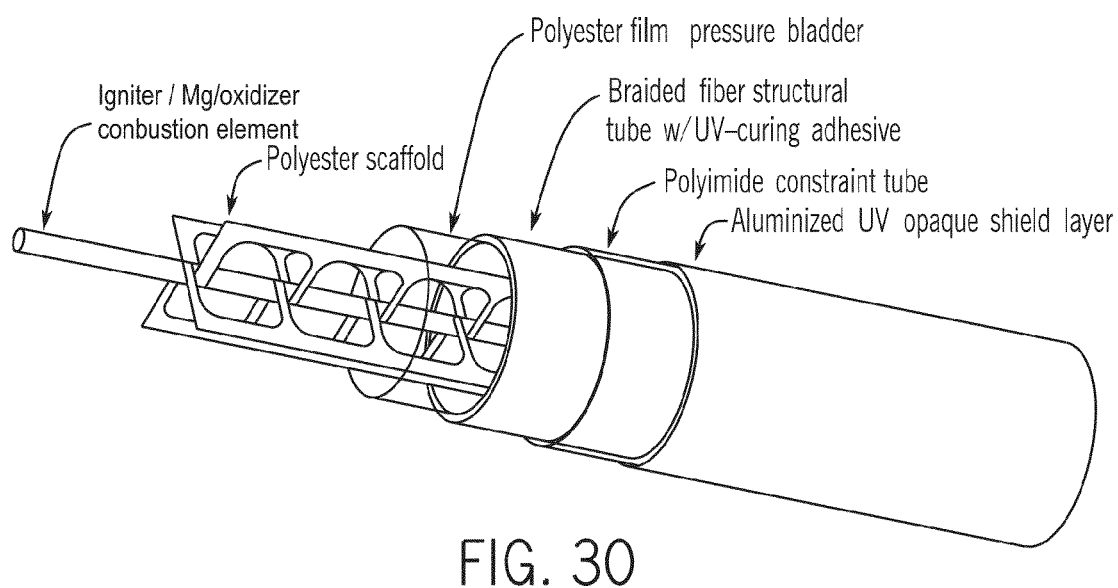
FIG. 30 shows a schematic of an exemplary layout of wing tube components.
Figure 31:
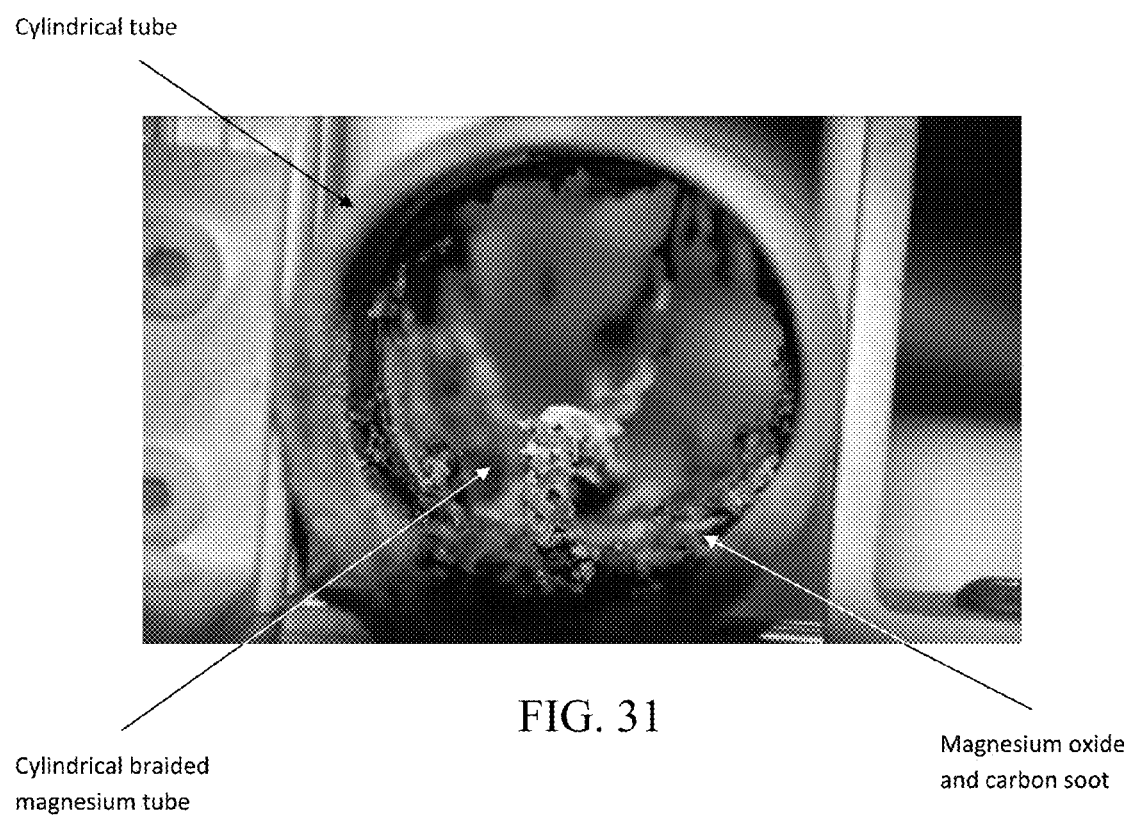
FIG. 31 shows an image of a post combustion cylindrical composite section and remains of a braided magnesium element.

Experiments performed during the development of embodiments of the present invention demonstrated the curing of cylindrical composite samples with the combustion of the braided magnesium element. A 50 mm long by 50 mm diameter cylinder of quartz fabric and PERMABOND 625 acrylic adhesive (PERMABOND Engineering Adhesives, "UV625 UV Curable data sheet," 2006; herein incorporated by reference in its entirety) was assembled on a collapsible internal mandrel and inserted into the same tubular chamber used for the combustion element experiments (SEE FIG. 30). A 130 mm long braided magnesium combustion element was suspended in a polyester support and placed concentrically into the tube. The combustion process was vigorous, but did not cause any noticeable secondary combustion of the adhesive or polymer liner (SEE FIG. 31). The composite cylinder showed a combination of white magnesium oxide and carbon soot on its interior surface The composite sample was in good condition. An evaluation of the sample showed that it was fully cured. The experiment was conducted with compressed $N_2$ flushing/cooling gas instead of a liquid $CO_2$. It was expected to have experienced some overheating, and some evidence of such heating was observed. However all of the quartz fiber including that in areas of surface damage remained fully encapsulated in acrylic, and the sample was demonstrated to be structurally sound and rigidized.

Example 5

Wind Turbine Support Elements

In some embodiments, the present invention provides structural support towers for wind turbines that are lightweight and require minimal equipment or manpower for installation. In some embodiments, the present invention combines a conventional wind turbine rotor and generator with a lightweight composite support tower that is transported to the installation site in a highly compact flexible form. In some embodiments, the support tower is transported to the site in a compact form, unpacked, expanded to its full length via pneumatic inflation, and hardened with a sunlight catalyzed photochemical process to result in a rigid load supporting tower.

In some embodiments, an inflatable and rigidizable composite tower is capable of being designed as either an externally guy-wire supported tower for micro-wind applications of 0.1-5 kW (e.g. 0.1-1 kW), or a monopole for applications 1 kW or greater (e.g. 1 kW, 2 kW, 5 kW, 10 kW, 20 kW, 50 kW, etc.). In some embodiments, a monopole or guy-wire-supported tower requires a foundation, for example, the same type of foundation used for a steel tower. In some embodiments, the foundation accommodates the same axial thrust and wind loading conditions as for a traditional tower.

In some embodiments, for micro-wind applications, the tower is inflated and rigidized on the ground after which the turbine assembly is attached and the tower is manually lifted into place and anchored with the guy wires. In some embodiments, for larger applications requiring a monopole, the tower is affixed to the foundation, inflated vertically then sun-rigidized. In some embodiments, the strength and stiffness of the composite monopole combined with a top mounted pulley allows the hoisting of the heavier turbine unit after rigidization eliminating the need for a crane. In some embodiments, side mounted climbing lugs allow a person to ascend the tower for installation and maintenance of the turbine.

In some embodiments, the technology that enables this application is a composite material that is cured in the presence of ultraviolet light (described above). The adhesive matrix is delayed from curing to a rigid state by preventing its exposure to UV light. In some embodiments, while an undeployed or packed tower is shielded from any light, it remains flexible for an indefinite period of time. In some embodiments, the uncured fabric is exposed to a UV source of sufficient power (e.g. sun and/or UV generating device or system), catalyzing a polymerization or cross-linking reaction, and resulting in the encapsulation of structural fibers in a rigid polymer matrix. In some embodiments, quartz is used as the structural fiber material. In some embodiments, quartz glass provides transparency to UV in the spectral range of 250-400 nm, as well as advantageous mechanical properties (e.g. tensile strength of 655 MPa and a Youngs modulus of 54 GPa).

Figure 32A:
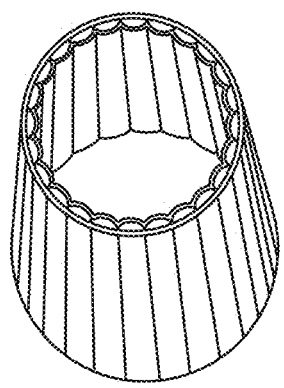
FIG. 32 shows images of a cross sectional design of tower (FIG. 32A), tower inflation (FIG. 32B), turbine hoisting (FIG. 32C).
Figure 32B:
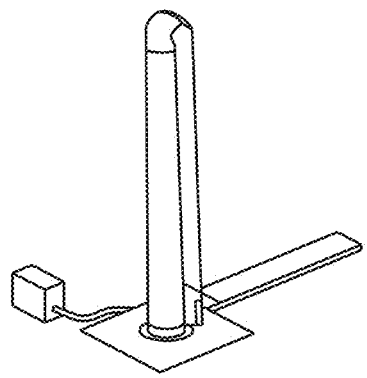
Figure 32C:
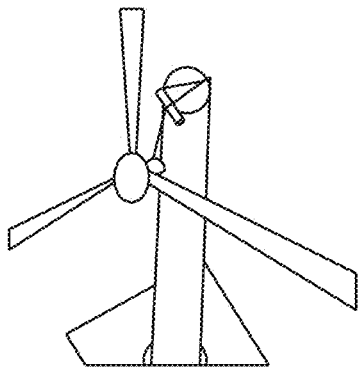

In some embodiments, a composite monopole is designed with a rigid flange (e.g. circular) that is bolted down to the foundation. In some embodiments, a flange supports the flexible tower during inflation and/or supports the axial and bending loads imparted on the tower during its operation. In some embodiments, one or more longitudinal chambers (e.g. a series of longitudinal chambers) ring the interior wall of the tube to increase its bending stiffness while keeping the outer wall thinner for less mass and easier foldability before rigidization (SEE FIG. 32).

In some embodiments, at the installation site, the flexible tower is removed from its photo-resistant container and its flange collar is attached (e.g. bolted) to the foundation. An inflation mechanism (e.g. air pump (e.g. portable air pump)) is used to inflate the tower. In some embodiments, after the tower is fully inflated, the pump will remain running until the tower has been exposed to sufficient UV light (e.g. sunlight) for rigidization. In some embodiments, installation is carried out before dawn, in order for the tower to be fully inflated before it is exposed to UV rays after sunrise.

In developing embodiments of the present invention, a basic feasibility analysis was carried out to compare the overall performance of a representative small wind turbine (2.5 kW peak output) mounted on a conventional steel tower and the same turbine mounted on the inflatable rigidizable composite tower optimized to different parameters. Using a constant diameter rotor at increasing heights results in lower power gains but is reasonable for small installations in which simplicity is of higher priority (C. Kjaer, B. Douglas, R. Bianchin and E. Zander, "Wind energy the facts, volumes 1-5," European Wind Energy Association, Brussels Belgium, 2009, herein incorporated by reference in its entirety). The comparisons were based on currently available steel towers with heights 10.2, 13.7 and 18.3 m. Two variations of the comparison were made requiring the inputs of the steel tower properties (M. Gardiner, "Skystream 3.7 sectional monopole tower foundation and installation manual," Southwest Windpower, Inc., Flagstaff, Ariz. 86001 USA, Tech. Rep. 3-CMLT-1367-01, 2009, herein incorporated by reference in its entirety), wind turbine performance, mass and rotor diameter (Southwest Windpower, "Southwest Wind Energy, turbines, towers and accessories," vol. 2010, 2010, herein incorporated by reference in its entirety), wind speed at tower base and cost of components and materials (L. Fingersh, M. Hand and A. Laxson, "Wind turbine design cost and scaling model," NREL, vol. 12, pp. 2006, 2006, herein incorporated by reference in its entirety). The parameters and requirements controlled in those comparisons are summarized in Table 1. The comparisons made with standard steel towers and turbines are summarized in Table 2. The output data from each comparison was used to calculate output power per mass (kW/kg) (J. W. Tester, E. M. Drake, M. J. Driscoll, M. W. Golay and W. A. Peters, Sustainable Energy: Choosing among Options. The MIT Press, 2005, R. Wiser and M. Bolinger, "Annual report on US wind power installation, cost, and performance trends: 2007," Lawrence Berkeley National Laboratory, Report Summary, 2008, herein incorporated by reference in their entireties) and transported cost per output power (W/$) (K. Smith, "WindPACT Turbine Design Scaling Studies Technical Area 2: Turbine, Rotor, and Blade Logistics," National Renewable Energy Laboratory, NREL/SR-500-29439, 2001, herein incorporated by reference in its entirety).

TABLE 1

Parameters and requirements set for the composite wind turbines

1 Mass, geometry and mechanical properties of the towers designed to withstand storm winds of 67 m/s (150 mph)
2 Tower inflation pressure, flow rate and compressor power required to inflate the towers in winds of +10 m/s.
3 Required sunlight curing time for rigidization assuming blue sky conditions and ground reflectance of green grass.
4 Peak turbine output power at relevant height
5 Total mass of tower, turbine and tower specific primary equipment.
6 Shipping cost of each tower and turbine system via small aircraft for distance of 1000 km

TABLE 2

Comparison performed and goals set for comparisons

| Comparison | Goal |
|---|---|
| (1) Optimized composite towers to the same overall mass as the steel towers/turbine assemblies. | Maximize the height of the composite tower to take advantage of increased wind speeds at positions higher than the steel tower allows. |
| (2) Optimized composite towers with the same overall height as the steel towers. | Minimize the weight of the composite tower thus lowering the transported mass but allow the same power output performance of the steel towers. |

Figure 33A:
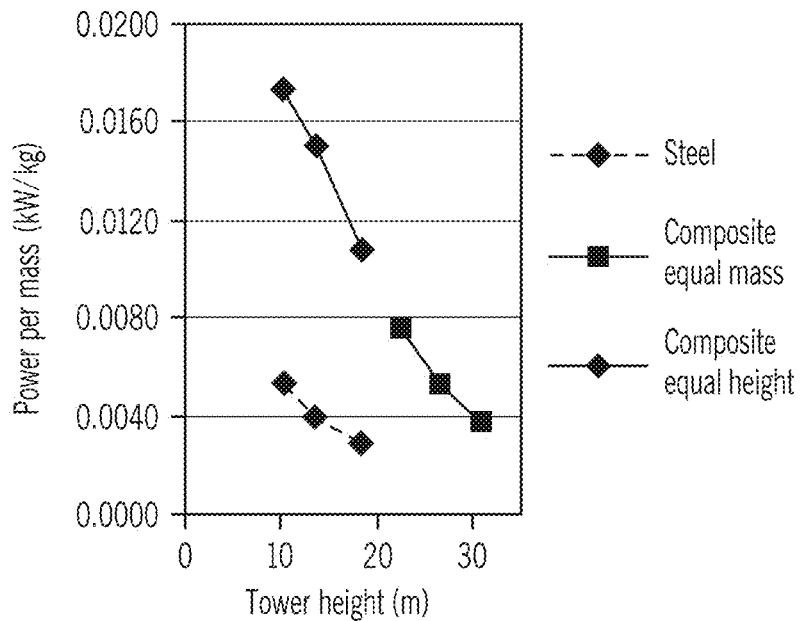
FIG. 33 shows peak power available per total mass vs. tower height (FIG. 33A), cost of generated power after transportation (FIG. 33B).
Figure 33B:
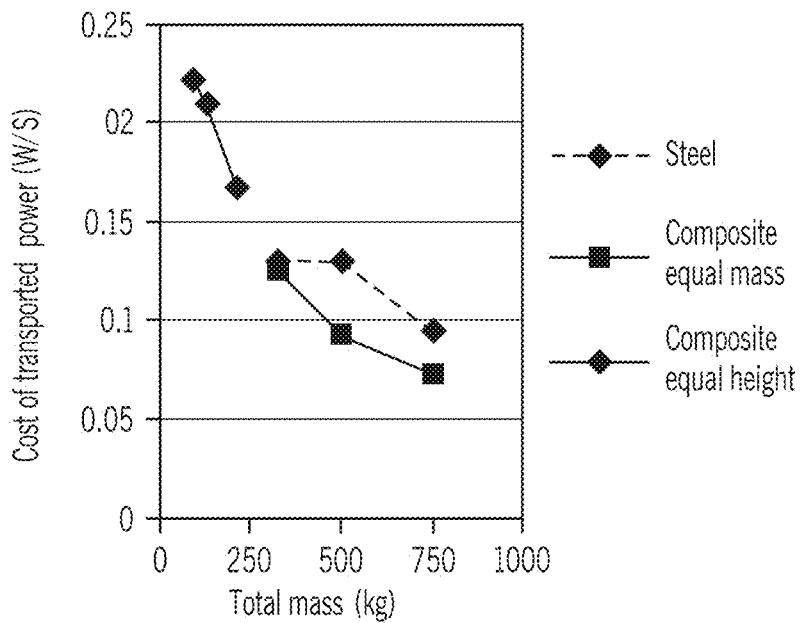

On a height basis, the composite tower/turbine can produce ~3.5 times the power output per weight (SEE FIG. 33). This is primarily due to the significantly lower density of the composite material. On a mass basis the turbine power output using the composite tower is ~1.6-1.75 times greater than the steel tower. This trend is mainly due to the increased wind resistance against the turbine prop from the higher wind velocities and the increased area of the higher and larger diameter composite tower all of which require additional structural material.

The cost of transported power is the combined cost of tower, turbine and necessary installation equipment added to the estimated shipping cost. Mass was calculated with mass equivalency rates for bulky cargo as used in large aircraft shipping (D. F. Wood, A. P. Barone, P. Murphy and D. L. Wardlow, International Logistics., $2^{nd}$ ed. AMACOM/American Management Association, 2002, herein incorporated by reference in its entirety). These equivalent masses were multiplied by the cargo rates for light aircraft (Planequest.com LLC, "Operation Costs of small aircraft," vol. 2010, herein incorporated by reference in its entirety) if it were to be flown 1000 km to a remote town then transported to the site by locals. On a height basis the composite tower can deliver twice the power per dollar compared to the steel tower (SEE FIG. 33).

The cost associated with transporting the competing towers over rugged terrain is not factored into the equation due to the difficulty in converting the physical effort into a quantifiable dollar amount. This scenario is fairly likely in the remote installation of a turbine and is an important factor to the cost and success of the installation. In some embodiments, towers and support elements of the present invention are extremely advantageous in transportation over difficult and remote terrain.

Figure 34:
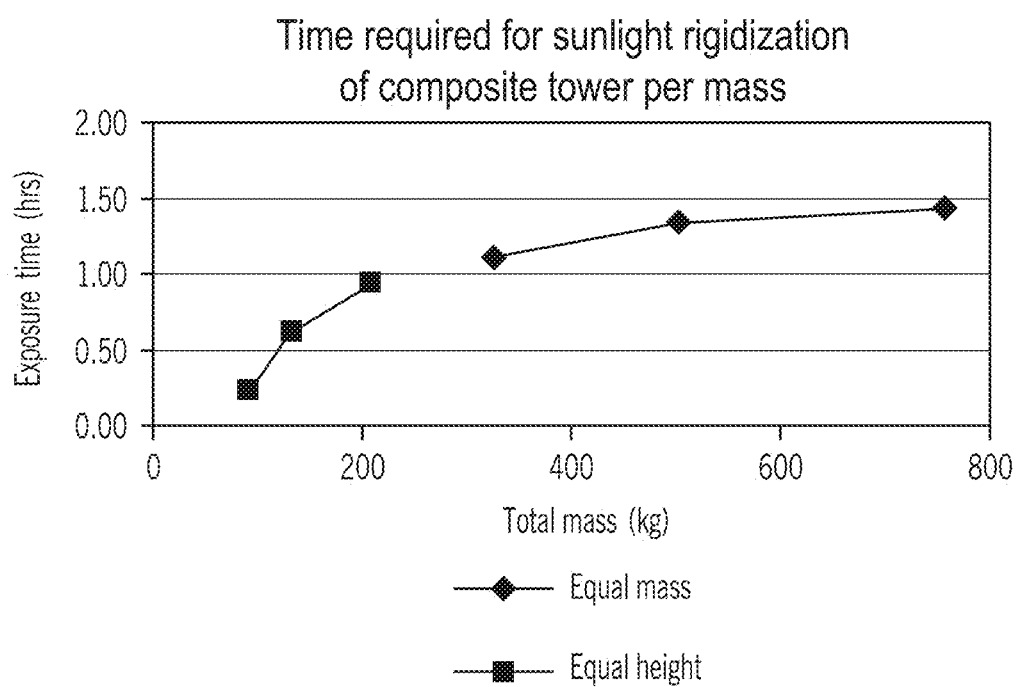
FIG. 34 shows a graph of the time required for sunlight rigidization of composite tower per mass.

In some embodiments, rigidization time depends on the intensity of radiation, total adhesive mass and total area of exposed adhesive. Experiments performed during development of embodiments of the present invention on composites with UV curing acrylic based adhesives provided data. In normal sunlight the composite tower of equal height cured to its rigid state from 15 minutes to just under an hour (SEE FIG. 34). The larger of the mass matching composite towers cures in less than 1.5 hours.

In some embodiments, the decreasing function of curing time vs. mass is due to the increase in surface area to the composite volume. This ensures that larger structures following the same basic geometric growth are not limited by the energy of adequately intense sun. Experiments performed during development of embodiments of the present invention indicate that UV curing adhesives are capable of curing in the reduced UV available on cloudy days.

In some embodiments, inflatable and rigidizable wind turbine towers provide up to 3.5 the power per mass and up to 2 times the power per cost compared to a steel tower when using the same 2.5 kW turbine unit while matching the safety standards of the steel towers. In some embodiments, the inflatable rigidizable design greatly aids the installation of an equally sized tower without requiring large equipment or cranes, thus saving large amounts of time and effort.

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

What is claimed is:

1. A rapid deployment structure system comprising:
    a UV-light-generating component configured to generate light via a combustion reaction, wherein said UV-light-generating component includes at least one braided cylindrical tube of pyrophoric metal and at least one solid oxidizer disposed along at least a portion of a length of said at least one braided cylindrical tube of pyrophoric metal;

a support element comprising (i) a flexible fabric component and (ii) an acrylic adhesive component, wherein said flexible fabric component is encapsulated within said acrylic adhesive component, wherein said support element has a collapsed configuration and an expanded configuration, and wherein said support element defines an enclosed volume having an inlet and an outlet, and said support element defines an axis in said expanded configuration;

a scaffold disposed within said enclosed volume, wherein said scaffold supports at least a portion of said UV-light-generating component within said enclosed volume along at least a portion of said axis;

an inflation system connected to said inlet of the enclosed volume for supplying compressed gas to said enclosed volume; and a pressure regulator connected to said outlet of said enclosed volume, wherein said pressure regulator is adapted to vent products from said combustion reaction to a space outside said enclosed volume.

2. The system of claim 1, wherein said at least one tube of pyrophoric metal comprises magnesium.

3. The system of claim 2, wherein said at least one solid oxidizer comprises solid $KClO_4$.

4. The system of claim 3, further comprising an igniter device.

5. The system of claim 4, wherein said at least one tube of pyrophoric metal and said at least one solid oxidizer are configured to combust upon ignition by said ignition device.

6. The system of claim 3, wherein said support element is tubular.

7. A method of deploying a support element comprising:
a) providing:
   i) a UV-light source configured to generate light via a combustion reaction, wherein said UV-light source includes at least one braided cylindrical tube of pyrophoric metal and at least one solid oxidizer disposed along at least a portion of a length of said at least one braided cylindrical tube of pyrophoric metal;
   ii) the support element comprising (A) a flexible fabric component and (B) an acrylic adhesive component, wherein said flexible fabric component is encapsulated within said acrylic adhesive component, and wherein said support element has a collapsed configuration and an expanded configuration, and wherein said support element defines an enclosed inner lumen having an inlet and an outlet, and said support element defines an axis along said inner lumen in said expanded configuration;
   iii) a scaffold disposed within said enclosed inner lumen, wherein said scaffold supports at least a portion of said UV-light source within said enclosed inner lumen along at least a portion of said axis;
   iv) an inflation system connected to said inlet of the enclosed inner lumen for supplying pressurized gas to said enclosed inner lumen; and
   v) a pressure regulator connected to said outlet of said enclosed inner lumen, wherein said pressure regulator is adapted to vent products from said combustion reaction to a space outside said enclosed inner lumen;
b) inflating said support element by applying pressurized gas from said inflation system to said inner lumen via said inlet; and
c) exposing said acrylic adhesive component to UV-light from said combustion reaction from said UV-light source, wherein said UV-light initiates curing of said acrylic adhesive component.

8. The method of claim 7, wherein curing of said acrylic adhesive component results in rapid rigidization of said support element.

9. The method of claim 8, wherein full rigidization of said support element is reached in less than 10 seconds following initiation of said combustion reaction.

10. The method of claim 9, wherein full rigidization of said support element is reached in less than 5 seconds following initiation of said combustion reaction.

11. The method of claim 7, wherein deploying said support elements results in deploying and supporting an aircraft wing.

12. The method of claim 7, wherein said support element is a wind turbine tower.

13. The method of claim 7, wherein said at least one tube of pyrophoric metal comprises magnesium.

14. The method of claim 13, wherein said at least one solid oxidizer comprises solid $KClO_4$.

15. The method of claim 14, wherein said support element is tubular.

* * * * *